(12) United States Patent
Dominguez et al.

(10) Patent No.: US 12,366,769 B2
(45) Date of Patent: Jul. 22, 2025

(54) INSERT FOR AUGMENTED REALITY VIEWING DEVICE

(71) Applicant: Magic Leap, Inc., Plantation, FL (US)

(72) Inventors: Daniel Roger Dominguez, Sunrise, FL (US); Samantha Jo Gamble, Plantation, FL (US); Robert Coleman Skelton, Sunrise, FL (US); Michael John Slipy, Oakland Park, FL (US); Paul Thomas Foster, Fort Lauderdale, FL (US); Jason Paul Hale, Pembroke Pines, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/361,546

(22) Filed: Jul. 28, 2023

(65) Prior Publication Data

US 2023/0375861 A1 Nov. 23, 2023

Related U.S. Application Data

(62) Division of application No. 17/497,940, filed on Oct. 10, 2021, now Pat. No. 11,762,222, which is a
(Continued)

(51) Int. Cl.
*G02C 9/00* (2006.01)
*G02B 27/01* (2006.01)
(Continued)

(52) U.S. Cl.
CPC ............ *G02C 9/00* (2013.01); *G02B 27/0176* (2013.01); *G02C 5/12* (2013.01); *G02C 5/126* (2013.01);
(Continued)

(58) Field of Classification Search
CPC .................................. G02C 5/12; G02C 5/126
(Continued)

(56) References Cited

U.S. PATENT DOCUMENTS 4,344,092 A 8/1982 Miller
4,652,930 A 3/1987 Crawford
(Continued)

FOREIGN PATENT DOCUMENTS

CN 100416340 C 9/2008
CN 101449270 A 6/2009
(Continued)

OTHER PUBLICATIONS

"Communication Pursuant to Article 94(3) EPC mailed on Feb. 21, 2024", European Patent Application No. 20770244.0, (8 pages).
(Continued)

*Primary Examiner* — Darryl J Collins
(74) *Attorney, Agent, or Firm* — Stephen M. De Klerk

(57) ABSTRACT

A visual perception device is described. The visual perception device has corrective optics for viewing virtual and real-world content. An insert for the corrective optics is attached using a magnetic set, pins and/or a nose piece. Interchangeable nose pieces allow for height adjustments to accommodate different users. The visual perception device has pliable components to absorb forces exerted on a nose piece and a protective barrier for limiting electric shock or ingress of dirt.

10 Claims, 11 Drawing Sheets

Related U.S. Application Data division of application No. 16/225,961, filed on Dec. 19, 2018, now Pat. No. 11,187,923.

(60) Provisional application No. 62/608,054, filed on Dec. 20, 2017.

(51) Int. Cl.
  *G02C 5/12* (2006.01)
  *G02C 7/10* (2006.01)
  *G02C 9/04* (2006.01)
  *G02C 11/00* (2006.01)

(52) U.S. Cl.
  CPC ................ *G02C 7/10* (2013.01); *G02C 11/10* (2013.01); *G02C 2200/02* (2013.01); *G02C 2200/04* (2013.01); *G02C 2200/08* (2013.01)

(58) Field of Classification Search
  USPC ............................................ 351/80, 88, 126
  See application file for complete search history.

(56) References Cited

U.S. PATENT DOCUMENTS

| | | | |
|---|---|---|---|
| 4,810,080 A | 3/1989 | Grendol et al. | |
| 4,997,268 A | 3/1991 | Dauvergne | |
| 5,007,727 A | 4/1991 | Kahaney et al. | |
| 5,074,295 A | 12/1991 | Willis | |
| 5,240,220 A | 8/1993 | Elberbaum | |
| 5,251,635 A | 10/1993 | Dumoulin et al. | |
| 5,257,050 A * | 10/1993 | Wiedner ................ G02C 5/126 |
| | | | 351/86 |
| 5,410,763 A | 5/1995 | Bolle | |
| 5,455,625 A | 10/1995 | Englander | |
| 5,495,286 A | 2/1996 | Adair | |
| 5,497,463 A | 3/1996 | Stein et al. | |
| 5,659,701 A | 8/1997 | Amit et al. | |
| 5,682,255 A | 10/1997 | Friesem et al. | |
| 5,689,669 A | 11/1997 | Lynch | |
| 5,689,835 A * | 11/1997 | Chao ................ G02C 5/126 |
| | | | 2/446 |
| 5,826,092 A | 10/1998 | Flannery | |
| 5,854,872 A | 12/1998 | Tai | |
| 5,864,365 A | 1/1999 | Sramek et al. | |
| 5,937,202 A | 8/1999 | Crosetto | |
| 6,002,853 A | 12/1999 | de Hond | |
| 6,012,811 A | 1/2000 | Chao et al. | |
| 6,016,160 A | 1/2000 | Coombs et al. | |
| 6,064,749 A | 5/2000 | Hirota et al. | |
| 6,076,927 A | 6/2000 | Owens | |
| 6,079,982 A | 6/2000 | Meader | |
| 6,117,923 A | 9/2000 | Amagai et al. | |
| 6,119,147 A | 9/2000 | Toomey et al. | |
| 6,124,977 A | 9/2000 | Takahashi | |
| 6,179,619 B1 | 1/2001 | Tanaka | |
| 6,191,809 B1 | 2/2001 | Hori et al. | |
| 6,219,045 B1 | 4/2001 | Leahy et al. | |
| 6,243,091 B1 | 6/2001 | Berstis | |
| 6,271,843 B1 | 8/2001 | Lection et al. | |
| 6,362,817 B1 | 3/2002 | Powers et al. | |
| 6,375,369 B1 | 4/2002 | Schneider et al. | |
| 6,385,735 B1 | 5/2002 | Wilson | |
| 6,396,522 B1 | 5/2002 | Vu | |
| 6,414,679 B1 | 7/2002 | Miodonski et al. | |
| 6,538,655 B1 | 3/2003 | Kubota | |
| 6,541,736 B1 | 4/2003 | Huang et al. | |
| 6,570,563 B1 | 5/2003 | Honda | |
| 6,573,903 B2 | 6/2003 | Gantt | |
| 6,590,593 B1 | 7/2003 | Robertson et al. | |
| 6,621,508 B1 | 9/2003 | Shiraishi et al. | |
| 6,690,393 B2 | 2/2004 | Heron et al. | |
| 6,757,068 B2 | 6/2004 | Foxlin | |
| 6,784,901 B1 | 8/2004 | Harvey et al. | |
| 6,961,055 B2 | 11/2005 | Doak | |
| 7,046,515 B1 | 5/2006 | Wyatt | |
| 7,051,219 B2 | 5/2006 | Hwang | |
| 7,076,674 B2 | 7/2006 | Cervantes | |
| 7,111,290 B1 | 9/2006 | Yates, Jr. | |
| 7,119,819 B1 | 10/2006 | Robertson et al. | |
| 7,211,986 B1 | 5/2007 | Flowerdew et al. | |
| 7,219,245 B1 | 5/2007 | Raghuvanshi | |
| 7,382,288 B1 | 6/2008 | Wilson | |
| 7,414,629 B2 | 8/2008 | Santodomingo | |
| 7,431,453 B2 | 10/2008 | Hogan | |
| 7,467,356 B2 | 12/2008 | Gettman et al. | |
| 7,542,040 B2 | 6/2009 | Templeman | |
| 7,573,640 B2 | 8/2009 | Nivon et al. | |
| 7,653,877 B2 | 1/2010 | Matsuda | |
| 7,663,625 B2 | 2/2010 | Chartier et al. | |
| 7,724,980 B1 | 5/2010 | Shenzhi | |
| 7,746,343 B1 | 6/2010 | Charaniya et al. | |
| 7,751,662 B2 | 7/2010 | Kleemann | |
| 7,758,185 B2 | 7/2010 | Lewis | |
| 7,788,323 B2 | 8/2010 | Greenstein et al. | |
| 7,804,507 B2 | 9/2010 | Yang et al. | |
| 7,814,429 B2 | 10/2010 | Buffet et al. | |
| 7,817,150 B2 | 10/2010 | Reichard et al. | |
| 7,844,724 B2 | 11/2010 | Van Wie et al. | |
| 8,060,759 B1 | 11/2011 | Arnan et al. | |
| 8,120,851 B2 | 2/2012 | Iwasa | |
| 8,214,660 B2 | 7/2012 | Capps, Jr. | |
| 8,246,408 B2 | 8/2012 | Elliot | |
| 8,353,594 B2 | 1/2013 | Lewis | |
| 8,360,578 B2 | 1/2013 | Nummela et al. | |
| 8,408,696 B2 * | 4/2013 | Hsieh ........................ G02C 1/06 |
| | | | 351/137 |
| 8,508,676 B2 | 8/2013 | Silverstein et al. | |
| 8,547,638 B2 | 10/2013 | Levola | |
| 8,605,764 B1 | 10/2013 | Rothaar et al. | |
| 8,619,365 B2 | 12/2013 | Harris et al. | |
| 8,696,113 B2 | 4/2014 | Lewis | |
| 8,698,701 B2 | 4/2014 | Margulis | |
| 8,733,927 B1 | 5/2014 | Lewis | |
| 8,736,636 B2 | 5/2014 | Kang | |
| 8,759,929 B2 | 6/2014 | Shiozawa et al. | |
| 8,793,770 B2 | 7/2014 | Lim | |
| 8,823,855 B2 | 9/2014 | Hwang | |
| 8,847,988 B2 | 9/2014 | Geisner et al. | |
| 8,874,673 B2 | 10/2014 | Kim | |
| 9,010,929 B2 | 4/2015 | Lewis | |
| 9,015,501 B2 | 4/2015 | Gee | |
| 9,086,537 B2 | 7/2015 | Iwasa et al. | |
| 9,095,437 B2 | 8/2015 | Boyden et al. | |
| 9,239,473 B2 | 1/2016 | Lewis | |
| 9,244,293 B2 | 1/2016 | Lewis | |
| 9,244,533 B2 | 1/2016 | Friend et al. | |
| 9,285,872 B1 | 3/2016 | Raffle et al. | |
| 9,383,823 B2 | 7/2016 | Geisner et al. | |
| 9,489,027 B1 | 11/2016 | Ogletree | |
| 9,519,305 B2 | 12/2016 | Wolfe | |
| 9,581,820 B2 | 2/2017 | Robbins | |
| 9,582,060 B2 | 2/2017 | Balatsos | |
| 9,658,473 B2 | 5/2017 | Lewis | |
| 9,671,566 B2 | 6/2017 | Abovitz et al. | |
| 9,671,615 B1 | 6/2017 | Vallius et al. | |
| 9,696,795 B2 | 7/2017 | Marcolina et al. | |
| 9,798,144 B2 | 10/2017 | Sako et al. | |
| 9,874,664 B2 | 1/2018 | Stevens et al. | |
| 9,880,441 B1 | 1/2018 | Osterhout | |
| 9,918,058 B2 | 3/2018 | Takahasi et al. | |
| 9,955,862 B2 | 5/2018 | Freeman et al. | |
| 9,978,118 B1 | 5/2018 | Ozgumer et al. | |
| 9,996,797 B1 | 6/2018 | Holz et al. | |
| 10,018,844 B2 | 7/2018 | Levola et al. | |
| 10,082,865 B1 | 9/2018 | Raynal et al. | |
| 10,151,937 B2 | 12/2018 | Lewis | |
| 10,185,147 B2 | 1/2019 | Lewis | |
| 10,218,679 B1 | 2/2019 | Jawahar | |
| 10,241,545 B1 | 3/2019 | Richards et al. | |
| 10,317,680 B1 | 6/2019 | Richards et al. | |
| 10,436,594 B2 | 10/2019 | Belt et al. | |
| 10,516,853 B1 | 12/2019 | Gibson et al. | |
| 10,551,879 B1 | 2/2020 | Richards et al. | |

(56) References Cited

U.S. PATENT DOCUMENTS

| | | | |
|---|---|---|---|
| 10,578,870 B2 | 3/2020 | Kimmel |
| 10,646,283 B2 | 5/2020 | Johnson et al. |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 11,262,585 B2 | 3/2022 | Potnis et al. |
| 11,710,430 B1 | 7/2023 | Wray |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0080976 A1 | 5/2003 | Satoh et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hul |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0126182 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0185398 A1 | 8/2007 | Kimura et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0050013 A1 | 2/2008 | Munro |
| 2008/0063802 A1 | 3/2008 | Maula et al. |
| 2008/0068557 A1 | 3/2008 | Menduni et al. |
| 2008/0084533 A1* | 4/2008 | Jannard ............ G02C 5/126 351/106 |
| 2008/0125218 A1 | 5/2008 | Collins |
| 2008/0146942 A1 | 6/2008 | Dala-Krishna |
| 2008/0173036 A1 | 7/2008 | Willaims |
| 2008/0177506 A1 | 7/2008 | Kim |
| 2008/0183190 A1 | 7/2008 | Adcox et al. |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | McCoy |
| 2009/0153797 A1 | 6/2009 | Allon et al. |
| 2009/0177445 A1 | 7/2009 | Capps, Jr. et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0060970 A1 | 3/2010 | Harris et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0287485 A1 | 11/2010 | Bertolami et al. |
| 2010/0296163 A1 | 11/2010 | Sarikko |
| 2010/0306715 A1 | 12/2010 | Geisner et al. |
| 2010/0309687 A1 | 12/2010 | Sampsell et al. |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0064268 A1 | 3/2011 | Cobb et al. |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2011/0317233 A1 | 12/2011 | Hayashibe et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0079466 A1 | 3/2012 | Gonion |
| 2012/0081392 A1 | 4/2012 | Arthur |
| 2012/0089854 A1 | 4/2012 | Breakstone |
| 2012/0113235 A1 | 5/2012 | Shintani |

(56) References Cited

U.S. PATENT DOCUMENTS

| | | |
|---|---|---|
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0280348 A1 | 11/2012 | Chou et al. |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0123015 A1 | 5/2014 | Sako et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0204438 A1 | 7/2014 | Yamada et al. |
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0292645 A1 | 10/2014 | Tsurumi |
| 2014/0309031 A1 | 10/2014 | Suzuki |
| 2014/0313228 A1 | 10/2014 | Kasahara |
| 2014/0333612 A1 | 11/2014 | Itoh et al. |
| 2014/0340498 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0015842 A1* | 1/2015 | Chen .................. G02C 5/12 351/136 |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0132596 A1 | 5/2015 | Yamada et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0163063 A1 | 6/2016 | Ashman |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0068020 A1 | 3/2017 | Batchko et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0172409 A1 | 6/2017 | Cavin et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214893 A1 | 7/2017 | Naftali et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |

(56) References Cited

U.S. PATENT DOCUMENTS

| | | |
|---|---|---|
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0336867 A1 | 11/2017 | Wilairat et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0039673 A1 | 2/2018 | Chen et al. |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0056305 A1 | 3/2018 | Sankey et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0101214 A1 | 4/2018 | Mahindru et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0196084 A1 | 7/2018 | Tustaniwskyj |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1 | 6/2019 | Hare |
| 2019/0179654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0307510 A1 | 10/2019 | Rotenberg et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184219 A1 | 6/2020 | Magura et al. |
| 2020/0184653 A1 | 6/2020 | Faulkner |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158023 A1 | 5/2021 | Fu et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |
| 2025/0039342 A1 | 1/2025 | Traczyk et al. |

FOREIGN PATENT DOCUMENTS

| | | |
|---|---|---|
| CN | 102448566 A | 5/2012 |
| CN | 103460255 A | 12/2013 |
| CN | 104040410 A | 9/2014 |
| CN | 104603675 A | 5/2015 |
| CN | 105938426 A | 9/2016 |
| CN | 106662754 A | 5/2017 |
| CN | 107004303 A | 8/2017 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1345168 A2 | 2/2003 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | H03-036974 U | 4/1991 |
| JP | 09-121370 A | 5/1997 |
| JP | H10-333094 A | 12/1998 |
| JP | 2002-015222 A | 1/2002 |
| JP | 2002-529806 | 9/2002 |

(56) References Cited

FOREIGN PATENT DOCUMENTS

| | | |
|---|---|---|
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2004-348169 A | 12/2004 |
| JP | 2005-151224 A | 6/2005 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2010-139575 | 6/2010 |
| JP | 2010-146030 A | 7/2010 |
| JP | 2010-526341 A | 7/2010 |
| JP | 2010-271526 A | 12/2010 |
| JP | 2011-033993 A | 2/2011 |
| JP | 2011-504522 A | 2/2011 |
| JP | 2011-257203 A | 12/2011 |
| JP | 2011-530131 A | 12/2011 |
| JP | 2012-8356 A | 1/2012 |
| JP | 2012-015774 A | 1/2012 |
| JP | 2012-088777 A | 5/2012 |
| JP | 2012-235036 A | 11/2012 |
| JP | 2013-525872 A1 | 6/2013 |
| JP | 2013-206322 A | 10/2013 |
| JP | 2013-250045 A | 12/2013 |
| JP | 2014-500522 A | 1/2014 |
| JP | 2014-90386 A | 5/2014 |
| JP | 2014-174366 A | 9/2014 |
| JP | 2014-524229 A | 9/2014 |
| JP | 2014-192550 A | 10/2014 |
| JP | 2015-156512 A | 8/2015 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2016-126134 A | 7/2016 |
| JP | 2017-015697 A | 1/2017 |
| JP | 2014-068465 A | 4/2017 |
| JP | 2017-108444 A | 6/2017 |
| JP | 2017-153498 | 9/2017 |
| JP | 2017-531840 A | 10/2017 |
| JP | 2017-535825 A | 11/2017 |
| JP | 6232763 B2 | 11/2017 |
| JP | 2018-503165 A | 2/2018 |
| JP | 6333965 B2 | 5/2018 |
| JP | 2018-173739 A | 11/2018 |
| JP | 2019-177134 A | 10/2019 |
| JP | 7344896 B2 | 9/2023 |
| KR | 2005-0010775 A | 1/2005 |
| KR | 10-2006-0059992 A | 6/2006 |
| KR | 10-2011-0006408 | 1/2011 |
| KR | 10-1372623 B1 | 3/2014 |
| KR | 10-2017-0017243 | 2/2017 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007037089 A1 | 4/2007 |
| WO | 2007041678 A2 | 4/2007 |
| WO | 2007/085628 A1 | 8/2007 |
| WO | 2007/085682 A1 | 8/2007 |
| WO | 2007/102144 A1 | 9/2007 |
| WO | 2008137299 A1 | 11/2008 |
| WO | 2008148927 A1 | 12/2008 |
| WO | 2009060125 A1 | 5/2009 |
| WO | 2009/101238 A1 | 8/2009 |
| WO | 2010015807 A1 | 2/2010 |
| WO | 2014203440 A1 | 12/2010 |
| WO | 2012030787 A2 | 3/2012 |
| WO | 2013/049012 A1 | 4/2013 |
| WO | 2013062701 A1 | 5/2013 |
| WO | 2013/145536 A1 | 10/2013 |
| WO | 2014033306 A1 | 3/2014 |
| WO | 2015/079610 A1 | 6/2015 |
| WO | 2015/143641 A1 | 10/2015 |
| WO | 2015194597 A1 | 12/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017051595 A1 | 3/2017 |
| WO | 2017120475 A1 | 7/2017 |
| WO | 2017176861 A1 | 10/2017 |
| WO | 2017203201 A1 | 11/2017 |
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018/166921 A | 9/2018 |
| WO | 2018166921 A1 | 9/2018 |
| WO | 2018236587 A1 | 12/2018 |
| WO | 2019040493 A1 | 2/2019 |
| WO | 2016075689 A1 | 5/2019 |
| WO | 2019148154 A1 | 8/2019 |
| WO | 2020010226 A1 | 1/2020 |

OTHER PUBLICATIONS

"Communication Pursuant to Article 94(3) EPC mailed on Jul. 28, 2023", European Patent Application No. 19843487.0, (15 pages).
"Communication Pursuant to Article 94(3) EPC mailed on Oct. 6, 2023", European Patent Application No. 19851373.1, (6 pages).
"Extended European Search Report issued on Jan. 8, 2024", European Patent Application No. 23195266.4, (8 pages).
"Extended European Search Report issued on Apr. 25, 2024", European Patent Application No. 23208907.8, (9 pages).
"Final Office Action mailed Oct. 16, 2023", U.S. Appl. No. 17/098,043, (7 pages).
"Final Office Action mailed on Dec. 1, 2023", U.S. Appl. No. 17/357,795, (18 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"First Office Action mailed Mar. 1, 2024 with English translation", Japanese Patent Application No. 2021-553297, (5 pages).
"First Office Action mailed Nov. 2, 2023 with English translation", Chinese Patent Application No. 201980090867.1, (16 pages).
"First Office Action mailed on Dec. 11, 2023 with translation", Chinese Patent Application No. 201980032005.3, (17 pages).
"First Office Action mailed on Dec. 25, 2023 with English translation", Chinese Patent Application No. 2019800046303.8, (13 pages).
"First Office Action mailed on Feb. 1, 2024 with English translation", Chinese Patent Application No. 202080018865.4, (9 pages).
"First Office Action mailed Sep. 29, 2023 with English translation", Japanese Patent Application No. 2023-10887, (5 pages).
"Non Final Office Action mailed on Aug. 2, 2023", U.S. Appl. No. 17/807,600, (25 pages).
"Non Final Office Action mailed on Feb. 26, 2024", U.S. Appl. No. 18/046,739, (48 pages).

(56) References Cited

OTHER PUBLICATIONS

"Non Final Office Action mailed on Jul. 20, 2023", U.S. Appl. No. 17/650,188, (11 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Non Final Office Action mailed on Oct. 11, 2023", U.S. Appl. No. 17/357,795, (14 pages).
"Non Final Office Action mailed on Oct. 24, 2023", U.S. Appl. No. 17/259,020, (21 pages).
"Notice of Allowance mailed on Jul. 27, 2023 with English translation", Korean Patent Application No. 10-2020-7019685, (4 pages).
"Office Action mailed Nov. 21, 2023 with English Translation", Japanese Patent Application No. 2021-535716, (15 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Jul. 20, 2023 with English translation", Japanese Patent Application No. 2021-505884, (6 pages).
"Office Action mailed on Mar. 6, 2024 with English translation", Chinese Patent Application No. 201980053016.X, (7 pages).
"Office Action mailed on Nov. 7, 2023 with English translation", Korean Patent Application No. 10-2023-7036734, (5 pages).
"Office Action mailed on Nov. 8, 2023 with English translation", Chinese Patent Application No. 201980060018.1, (12 pages).
"Penultimate Office Action mailed on Oct. 19, 2023 with English translation", Japanese Patent Application No. 2021-509779, (5 pages).
"Second Office Action mailed on Sep. 25, 2023 with English translation", Japanese Patent Application No. 2020-567853, (8 pages).
"Wikipedia Dioptre", Jun. 22, 2018 (Jun. 22, 2018), XP093066995, Retrieved from the Internet: URL:https://en.wikipedia.org/w/index.php?title=Dioptre&direction=next&oldid=846451540 [retrieved on Jul. 25, 2023], (3 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Feb. 28, 2023", European Patent Application No. 19845418.3, (6 Pages).
"Communication Pursuant to Article 94(3) EPC mailed on Jan. 4, 2022", European Patent Application No. 20154070.5, (8 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Oct. 21, 2021", European Patent Application No. 16207441.3, (4 pages).
"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).
"Final Office Action mailed on Aug. 10, 2020", U.S. Appl. No. 16/225,961, (13 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"First Examination Report Mailed on Jul. 27, 2022", Chinese Patent Application No. 201980036675.2, (5 pages).

(56) References Cited

OTHER PUBLICATIONS

"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed on Apr. 13, 2023 with English Translation", Japanese Patent Application No. 2020-567766, (7 pages).
"First Office Action mailed on Dec. 22, 2022 with English translation", Chinese Patent Application No. 201980061450.2, (11 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019], Apr. 12, 2019, (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).
"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"Multi-core processor", TechTarget, 2013, (1 page).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).

(56) References Cited

OTHER PUBLICATIONS

"Non Final Office Action mailed on Feb. 2, 2022", U.S. Appl. No. 16/783,866, (8 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).
"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 5, 2020", U.S. Appl. No. 16/530,776, (45 pages).
"Non Final Office Action mailed on Oct. 22, 2019", U.S. Appl. No. 15/859,277, (15 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 29, 2021", U.S. Appl. No. 16/748,193, (62 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).
"Notice of Reason of Refusal mailed on Sep. 11, 2020 with English translation", Japanese Patent Application No. 2019-140435, (6 pages).
"Office Action mailed May 31, 2023", Israeli Patent Application No. 275373, (5 pages).
"Office Action mailed on Apr. 13, 2023 with English translation", Japanese Patent Application No. 2020-533730, (13 pages).
"Office Action mailed on Jun. 8, 2023 with English translation", Japanese Patent Application No. 2021-503762, (6 pages).
"Office Action mailed on Mar. 30, 2023 with English translation", Japanese Patent Application No. 2020-566620, (10 pages).
"Office Action mailed on Nov. 24, 2022 with English Translation", Japanese Patent Application No. 2020-533730, (11 pages).
"Phototourism Challenge", CVPR 2019 Image Matching Workshop. https://image matching-workshop.github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Summons to attend oral proceedings pursuant to Rule 115(1) EPC mailed on Jul. 15, 2019", European Patent Application No. 15162521.7, (7 pages).
Aarik, J., et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews/koi-pond-top-iphone-app-store-paid-app/—[retrieved on Aug. 9, 2022].
Arandjelović, Relja, et al., "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Battaglia, Peter W, et al., "Relational inductive biases, deep learning, and graph networks", arXiv:1806.01261, Oct. 17, 2018, pp. 1-40.
Berg, Alexander C, et al., "Shape matching and object recognition using low distortion correspondences", In CVPR, 2005, (8 pages).
Bian, Jiawang, et al., "GMS: Grid-based motion statistics for fast, ultra-robust feature correspondence.", In CVPR (Conference on Computer Vision and Pattern Recognition), 2017, (10 pages).
Bimber, Oliver, et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric, et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Con-

(56) References Cited

OTHER PUBLICATIONS ference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S, et al., "Learning graph matching", IEEE TPAMI, 31(6):1048-1058, 2009.
Cech, Jan, et al., "Efficient sequential correspondence selection by cosegmentation", IEEE Tpami, 32(9):1568-1581, Sep. 2010.
Chittineni, C., et al., "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela, et al., "ScanNet: Richly-annotated 3d reconstructions of indoor scenes", In CVPR, arXiv:1702.04405v2 [cs.CV] Apr. 11, 2017, (22 pages).
Deng, Haowen, et al., "PPFnet: Global context aware local features for robust 3d point matching", In CVPR, arXiv:1802.02669v2 [cs.CV] Mar. 1, 2018, (12 pages).
Detone, Daniel, et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel, et al., "Self-improving visual odometry", arXiv:1812.03245, Dec. 8, 2018, (9 pages).
Detone, Daniel, et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai, et al., "D2-net: A trainable CNN for joint detection and description of local features", CVPR, arXiv:1905.03561v1 [cs.CV] May 9, 2019, (16 pages).
Ebel, Patrick, et al., "Beyond cartesian representations for local descriptors", ICCV, arXiv:1908.05547v1 [cs.CV] Aug. 15, 2019, (11 pages).
Fischler, Martin A, et al., "Random sample consensus: a paradigm for model fitting with applications to image analysis and automated cartography", Communications of the ACM, 24(6): 1981, pp. 381-395.
Gilmer, Justin, et al., "Neural message passing for quantum chemistry", In ICML, arXiv:1704.01212v2 [cs.LG] Jun. 12, 2017, (14 pages).
Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.
Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.
Hartley, Richard, et al., "Multiple View Geometry in Computer Vision", Cambridge University Press, 2003, pp. 1-673.
Jacob, Robert J.K., "Eye Tracking in Advanced Interface Design", Human-Computer Interaction Lab, Naval Research Laboratory, Washington, D.C., date unknown. 2003, pp. 1-50.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho, et al., "Set transformer: A frame-work for attention-based permutation-invariant neural networks", ICML, arXiv:1810.00825v3 [cs.LG] May 26, 2019, (17 pages).
Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia, et al., "Graph Matching Networks for Learning the Similarity of Graph Structured Objects", arxiv.org, Cornell University Library, 201 Olin Library Cornell University Ithaca, NY 14853, XP081268608.
Li, Yujia, et al., "Graph matching networks for learning the similarity of graph structured objects", ICML, arXiv:1904.12787v2 [cs.LG] May 12, 2019, (18 pages).
Li, Zhengqi, et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al., "A survey for the quadratic assignment problem", European journal of operational research, 176(2): 2007, pp. 657-690.
Lowe, David G, "Distinctive image features from scale-invariant keypoints", International Journal of Computer Vision, 60(2): 91-110, 2004, (28 pages).
Luo, Zixin, et al., "ContextDesc: Local descriptor augmentation with cross-modality context", CVPR, arXiv:1904.04084v1 [cs.CV] Apr. 8, 2019, (14 pages).
Luo, Zixin, et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], pp. 2522-2531.
Memon, F., et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo, et al., "Short-range FMCW monopulse radar for hand-gesture sensing", 2015 IEEE Radar Conference (RadarCon) (2015), pp. 1491-1496.
Mrad, et al., "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam, et al., "Automatic differentiation in Pytorch", 31st Conference on Neural Information Processing Systems (NIPS 2017), Long Beach, CA, USA, (4 pages).
Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al., "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R, et al., "Pointnet: Deep Learning on Point Sets for 3D Classification and Segmentation", CVPR, arXiv:1612.00593v2 [cs.CV] Apr. 10, 2017, (19 pages).
Radenović, Filip, et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).

(56) References Cited

OTHER PUBLICATIONS

Ranftl, René, et al., "Deep fundamental matrix estimation", European Conference on Computer Vision (ECCV), 2018, (17 pages).
Revaud, Jerome, et al., "R2D2: Repeatable and Reliable Detector and Descriptor", In NeurIPS, arXiv:1906.06195v2 [cs.CV] Jun. 17, 2019, (12 pages).
Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten, et al., "SCRAMSAC: Improving RANSAC's efficiency with a spatial consistency filter", ICCV, 2009: 2090-2097., (8 pages).
Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard, et al., "Concerning nonnegative matrices and doubly stochastic matrices.", Pacific Journal of Mathematics, 1967, pp. 343-348.
Spencer, T., et al., "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
Zhang, Zen, et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.
"Extended European Search Report issued on Jul. 9, 2024", European Patent Application No. 24166847.4, (8 pages).
"Final Office Action mailed on May 24, 2024", U.S. Appl. No. 18/046,739, (52 pages).
"First Office Action mailed Jun. 24, 2024 with English translation", Japanese Patent Application No. 2022-504602, (7 pages).
"Non Final Office Action mailed on Jun. 17, 2024", U.S. Appl. No. 18/348,732, (19 pages).
"Communication Pursuant to Article 94(3) EPC mailed on Mar. 11, 2024", European Patent Application No. 20798769.4, (12 pages).
"Extended European Search Report issued on Aug. 6, 2024", European Patent Application No. 24184599.9, (14 pages).
"First Office Action mailed Jun. 20, 2024 with English translation", Japanese Patent Application No. 2021-564496, (14 pages).
"First Office Action mailed Mar. 20, 2024 with English translation", Chinese Patent Application No. 202080048293.4, (22 pages).
"First Office Action mailed on Mar. 25, 2024 with English translation", Chinese Patent Application No. 202080018919.7, (31 pages).
"First Office Action with English translation dated Aug. 8, 2024", Chinese Patent Application No. 202080053774.4, (23 pages).
"Non Final Office Action mailed on Sep. 24, 2024", U.S. Appl. No. 18/597,716, (9 pages).
"Penultimate Office Action mailed on Sep. 17, 2024 with English translation", Japanese Patent Application No. 2023-115047, (7 pages).
"Second Office Action with English translation mailed on Jul. 2, 2024", Chinese Patent Application No. 201980032005.3, (15 pages).
"Communication Pursuant to Article 94(3) EPC mailed Nov. 28, 2024", European Patent Application No. 19885958.9, (5 pages).
"Communication Pursuant to Article 94(3) EPC mailed on Nov. 21, 2024", European Patent Application No. 20846338.0, (11 pages).
"Extended European Search Report issued on Dec. 2, 2024", European Patent Application No. 24167829.1, (7 pages).
"Final Office Action mailed on Dec. 13, 2024 with English translation", Japanese Patent Application No. 2021-564496, (13 pages).
"First Office Action mailed Oct. 17, 2024 with English translation", Japanese Patent Application No. 2022-527990, (24 pages).
"Non Final Office Action mailed on Jan. 3, 2025", U.S. Appl. No. 18/746,709, (31 pages).
"Notice of Reasons for Rejection mailed on Dec. 4, 2024 with English tranlsation", Japanese Patent Application No. 2023-118968, (9 pages).
"Office Action mailed on Nov. 7, 2024 with English translation", Korean Patent Application No. 10-2024-7032937, (7 pages).
"Communication Pursuant to Article 94(3) EPC mailed on Feb. 7, 2025", European Patent Application No. 20154070.5, (7 pages).

(56) References Cited

OTHER PUBLICATIONS

"Office Action mailed Feb. 20, 2025 with English translation", Japanese Patent Application No. 2024-135314, (6 pages).
"Office Action mailed on Jan. 22, 2025 with English translation", Japanese Patent Application No. 2024-63271, (8 pages).
"Communication Pursuant to Article 94(3) EPC mailed on Mar. 18, 2025", European Patent Application No. 19810142.0, (8 pages).
"Non Final Office Action mailed on Apr. 16, 2025", U.S. Appl. No. 18/679,328, (10 pages).
"Office Action mailed on Apr. 16, 2025 with English Translation", Japanese Patent Application No. 2024-139589, (8 pages).
"Office Action mailed on Apr. 16, 2025 with English Translation", Japanese Patent Application No. 2022-527990, (9 pages).
"Office Action mailed on Mar. 17, 2025 with English Translation", Japanese Patent Application No. 2023-221068, (9 pages).
"Second Office Action with English translation mailed on Mar. 25, 2025", Chinese Patent Application No. 202080053774.4, (11 pages).

\* cited by examiner

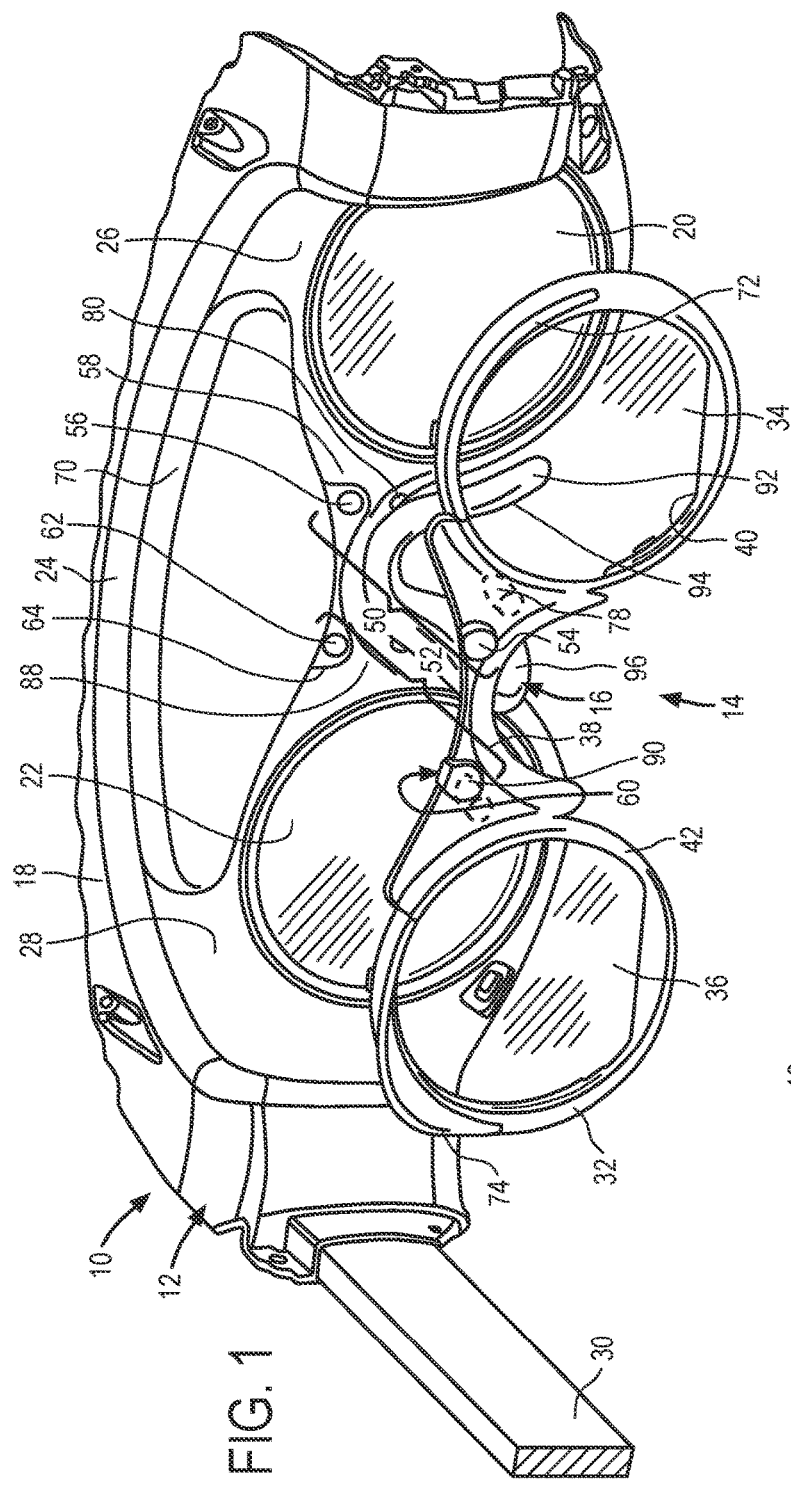
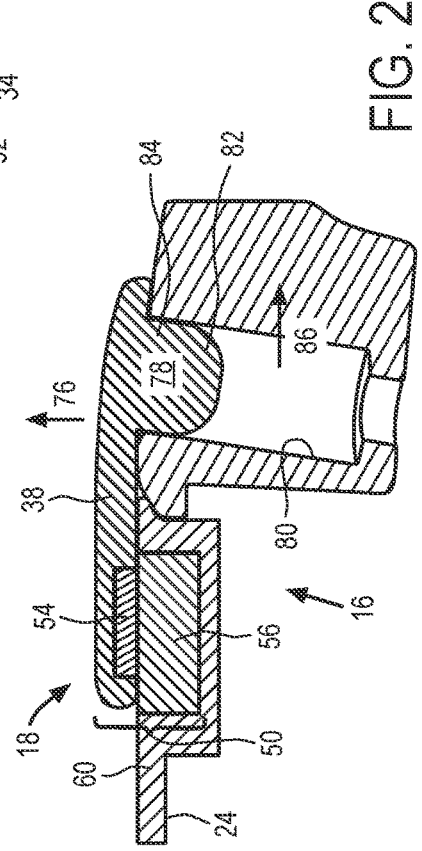
FIG. 1
FIG. 2

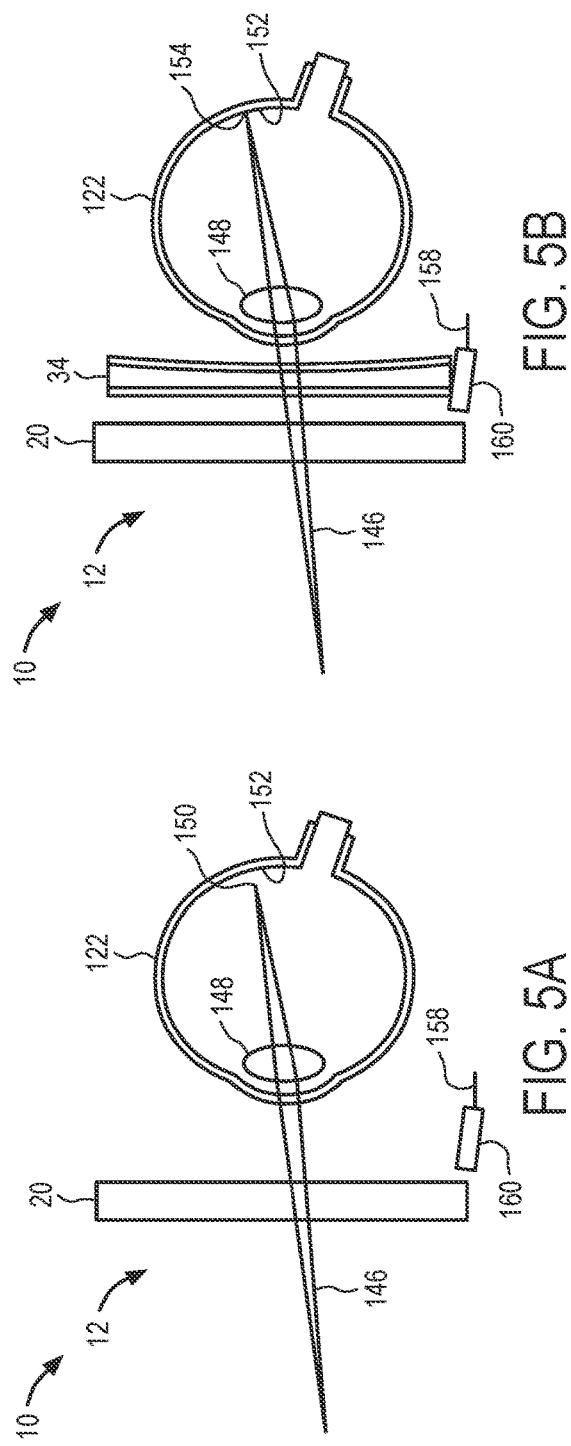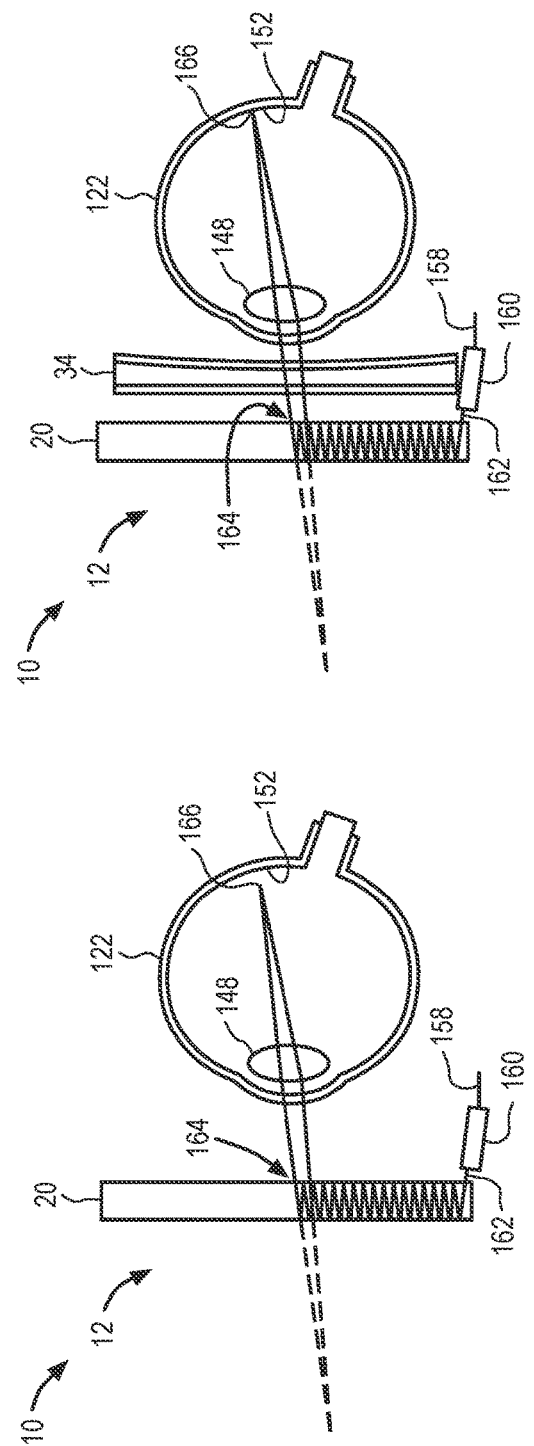

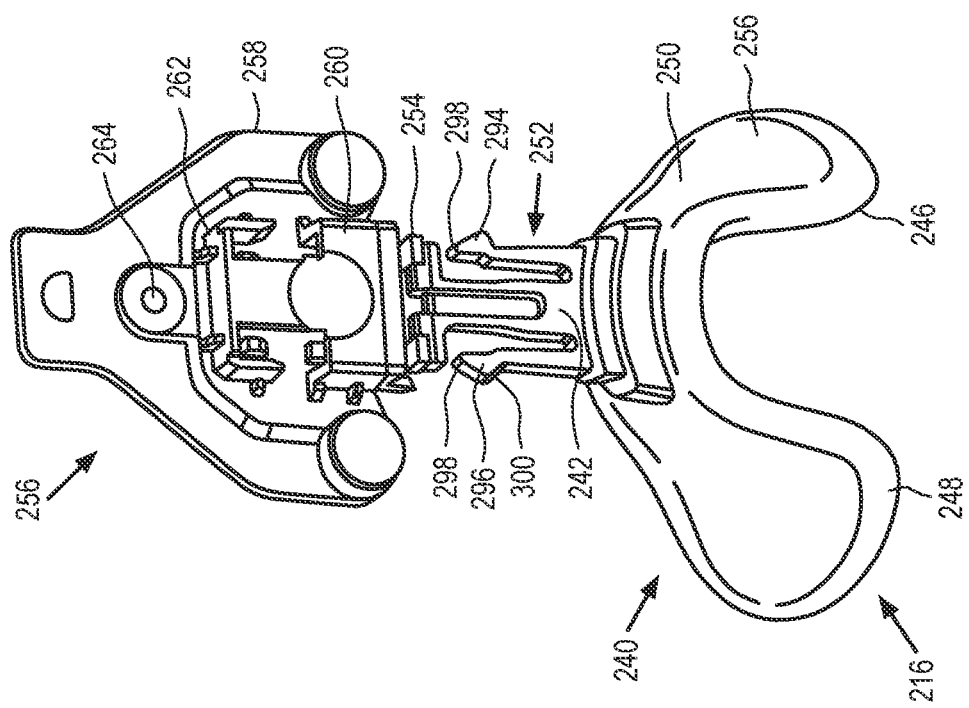
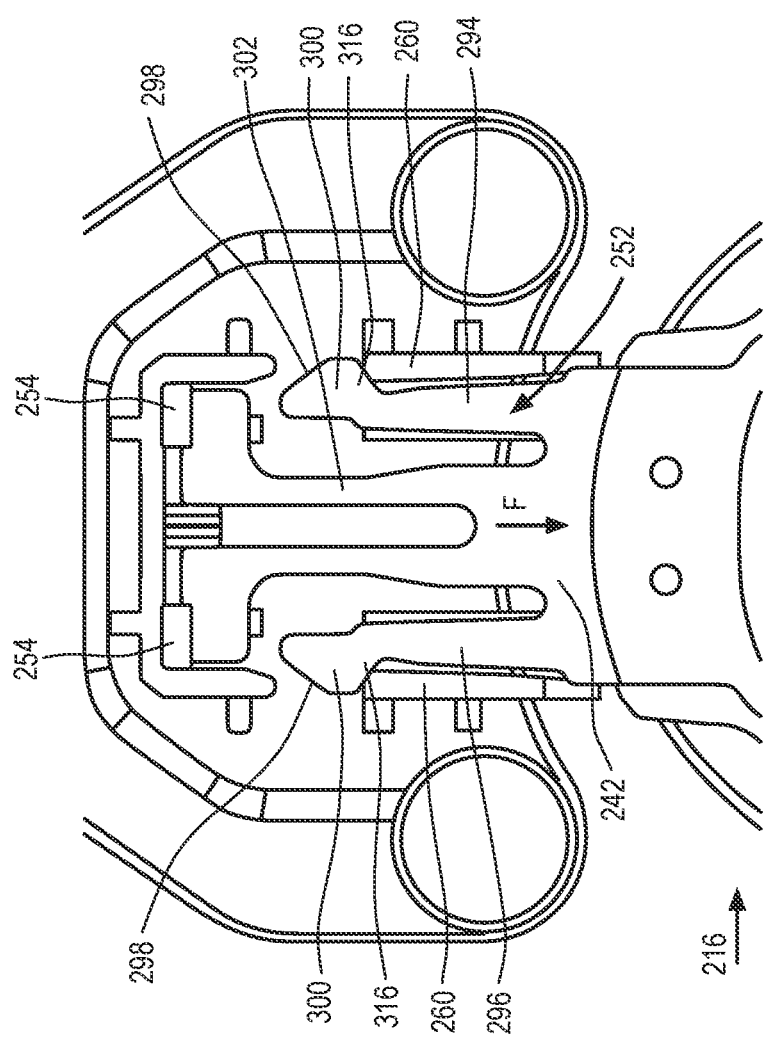

INSERT FOR AUGMENTED REALITY VIEWING DEVICE

CROSS-REFERENCE TO RELATED APPLICATIONS

This application is a divisional of U.S. patent application Ser. No. 17/497,940, filed on Oct. 10, 2021, which is a divisional of U.S. patent application Ser. No. 16/225,961, filed on Dec. 19, 2018 now U.S. Pat. No. 11,187,923, which claims priority from U.S. Provisional Patent Application No. 62/608,054, filed on Dec. 20, 2017, each of which is incorporated herein by reference in their entirety.

BACKGROUND OF THE INVENTION

1). Field of the Invention

This invention relates to a visual perception device.

2). Discussion of Related Art

Modern computing and display technologies have facilitated development of visual perception devices such as "virtual reality" viewing devices. A virtual reality viewing device is a wearable device that presents the user with two images, one for the left eye and one for the right eye. Objects in the images differ from one another in a manner that allows the brain to process the object as a three-dimensional object. When the images constantly change, movement in three-dimensions can be simulated. A virtual reality viewing device typically involves presentation of digital or virtual image information without transparency to other real-world objects.

Other visual perception devices, so called "augmented reality" viewing devices usually include technology that allows for the presentation of digital or virtual image information as an augmentation to visualization of the actual world around the user.

Visual perception devices of the above kind often have a strap that fits around a head of a user or other structure that fits on the head of a user. These straps or structures are frequently adjustable to suit the user. Other user-specific accommodations are usually not included in such visual perception devices. For example, a user may require corrective optics in order to see an image that is rendered (in a virtual reality viewing device or an augmented reality viewing device) or to see real objects in the actual world around the user (in an augmented reality viewing device).

Visual perception devices such as augmented reality viewing devices, virtual reality viewing devices, prescription and nonprescription glasses usually have a nose piece. The nose piece fits over the user's nose and assist in carrying the weight the visual perception device. A nose piece of a visual perception device is usually not interchangeable to fit different users.

SUMMARY OF THE INVENTION

The invention provides a visual perception device including a viewing device frame that includes at least a first viewing device frame component, at least a first viewing component secured to the viewing device frame, an insert frame that includes at least a first corrective component and an attachment system that includes at least a first magnetic set having first and second connecting components secured to the first viewing device frame component and the insert frame respectively, the first and second connecting components of the first magnetic set being attracted to one another by a north-south magnetic attraction when located in proximity to one another to secure the insert frame to the first viewing device frame component The invention further provides a method of visually perceiving light including locating first and second connecting components in proximity to one another, the connecting components being attracted to one another by a north-south magnetic attraction to secure a corrective component to a frame component and assemble a visual perception device and positioning the visual perception device over an eye with light being transmitted from a viewing component that is secured to the frame component, the corrective component being located in a path of the light to correct a refractive error of a lens of the eye and improve focusing of light on a retina of the eye.

The invention also provides a visual perception device including a viewing device frame, at least a first viewing component secured to the viewing device frame, an insert having at least a first viewing rim and an attachment system that includes at least a first magnetic set that includes first and second connecting components secured to the viewing device frame and the insert respectively, the connecting components of the first set being attracted to one another by a north-south magnetic attraction when located in proximity to one another to secure the insert to the viewing device frame with the first viewing component viewable though the first viewing rim.

The invention further provides a method of visually perceiving light including locating first and second connecting components in proximity to one another, the connecting components being attracted to one another by a north-south magnetic attraction to secure an insert to a viewing device frame to assemble a visual perception device with a first viewing component that is mounted to the viewing device frame viewable though a first viewing rim of the insert and positioning the visual perception device over an eye with light being transmitted from a viewing component secured to the frame component and the light passing through first viewing rim and focusing on a retina of the eye.

The invention also provides a visual perception device including first and second viewing components, a viewing device frame that includes at least a viewing device frame bridge connecting the first and second viewing components to one another, first and second corrective components, an insert frame that includes at least an insert frame bridge connecting the first and second corrective components to one another to form an insert and an attachment system that includes a nose piece, the nose piece and the viewing device frame bridge having first and second inter-engaging locking formations respectively that are connectable to one another to mount the nose piece to the viewing device frame bridge, the nose piece having an upper surface contacting the insert frame bridge to hold the insert frame bridge in place against the viewing device frame bridge.

The invention further provides a method of visually perceiving light including removably mounting a nose piece to viewing device frame bridge to secure a corrective component to the frame bridge and assemble a visual perception device and positioning the visual perception device over an eye with light being transmitted from a viewing component secured to the frame component and the corrective component in a path of the light to correct a refractive error of a lens of the eye and improve focusing of light on the retina of the eye.

The invention also provides a visual perception device including a first nose piece that may include a respective locking component, a respective nose pad having a respective nose bridge portion and respective first and second nose tabs defining a respective inverted channel shape, a respective stem connecting the respective second locking component to the respective nose bridge portion, a respective first locking formation on the respective locking component, first and second viewing components, a viewing device frame that includes at least a viewing device frame bridge connecting the first and second viewing components to one another and a second locking formation on the viewing device frame bridge, the second locking formation and the respective first locking formation being first and second inter-engaging locking formations respectively that are connectable to one another to removably mount the first nose piece to the viewing device frame bridge.

The invention further provides a method of visually perceiving light including removably mounting a nose pad to a viewing device frame bridge and positioning the nose pad on a nose of a user, the nose pad having a nose bridge portion and first and second nose tabs defining an inverted channel shape, the nose bridge portion forming part of a viewing device frame that includes the viewing device frame bridge connecting first and second viewing components.

The invention also provides a visual perception device including a bionicle frame, a viewing component mounted to the bionicle frame, a shell piece, a nose piece mounted to the shell piece, the nose piece having first and second nose pads and a pliable member, the shell piece being connected to the bionicle frame through the pliable member.

The invention further provides a visual perception device including a bionicle frame, a viewing component mounted to the bionicle frame, a shell piece, a nose piece mounted to the shell piece, the nose piece having first and second nose pads and a barrier component located between the bionicle frame and the nose piece.

The invention also provides a visual perception device including a data channel to hold data representing an image, a projector connected to the data channel to convert the data into light representing the image and transmit the light representing the image as at least a first component of the light, wherein at least a second component of the light is transmitted from a surface of a real object simultaneously with the first component of the light and a corrective component through which at least one of the first component and second component of the light transmits before being refracted by a lens of an eye and then falling on a retina of the eye, the corrective component correcting a refractive error of the lens of the eye to improve focusing of the at least one component of the light on the retina of the eye.

The invention further provides a method of visually perceiving light including converting data representing an image into a first component of light representing the image, transmitting the at least first component of the light, the at least a first component of the light transmitting through a lens of an eye, wherein at least a second component of the light is transmitted from a surface of a real object through the lens of the eye simultaneously with the first component of the light and placing a corrective component in a path of the light to correct a refractive error of the lens of the eye and improve focusing of at least one of the first and second components of the light on the retina of the eye.

The invention also provides a visual perception device including a data channel to hold data representing an image, a projector connected to the data channel to convert the data into at least a first component of light representing the image and transmit the at least a first component of the light and a corrective component through which the at least first component of the light transmits before being refracted by a lens of an eye and then falling on a retina of the eye, the corrective component correcting a refractive error of the lens of the eye to improve focusing of the at least first component of the light on the retina of the eye.

The invention further provides a method of visually perceiving light including converting data representing an image into at least a first component of light representing the image, transmitting at least a first component of the light through a lens of the eye and placing a corrective component in a path of the at least a first component of the light to correct a refractive error of the lens of the eye and improve focusing of the at least first component of the light on the retina of the eye.

The invention also provides a visual device including a lens and at least a first infrared pass filter on the lens, the lens passing more infrared light with the first infrared pass filter than without the infrared pass filter.

BRIEF DESCRIPTION OF THE DRAWINGS

The invention is further described by way of examples with reference to the accompanying drawings, wherein:

FIG. 1 is a perspective view of a visual perception device, according to an embodiment of the invention, including a viewing device, a prescription insert, and an attachment system to secure the prescription insert to the viewing device;

FIG. 2 is a cross-sectional view of the viewing device with the prescription insert in place using the attachment system in FIG. 1;

FIGS. 5A and 5B are side views illustrating correction of myopia when viewing a real object using a lens of the prescription insert;

FIGS. 6A and 6B are side views illustrating correction of myopia of a rendered image;

FIG. 10 is a perspective view of the nose piece and an anchor piece;

FIG. 11 is a rear view of portions of the nose piece and the anchor piece after they have been attached to one another;

DETAILED DESCRIPTION OF THE INVENTION

Figure 3:
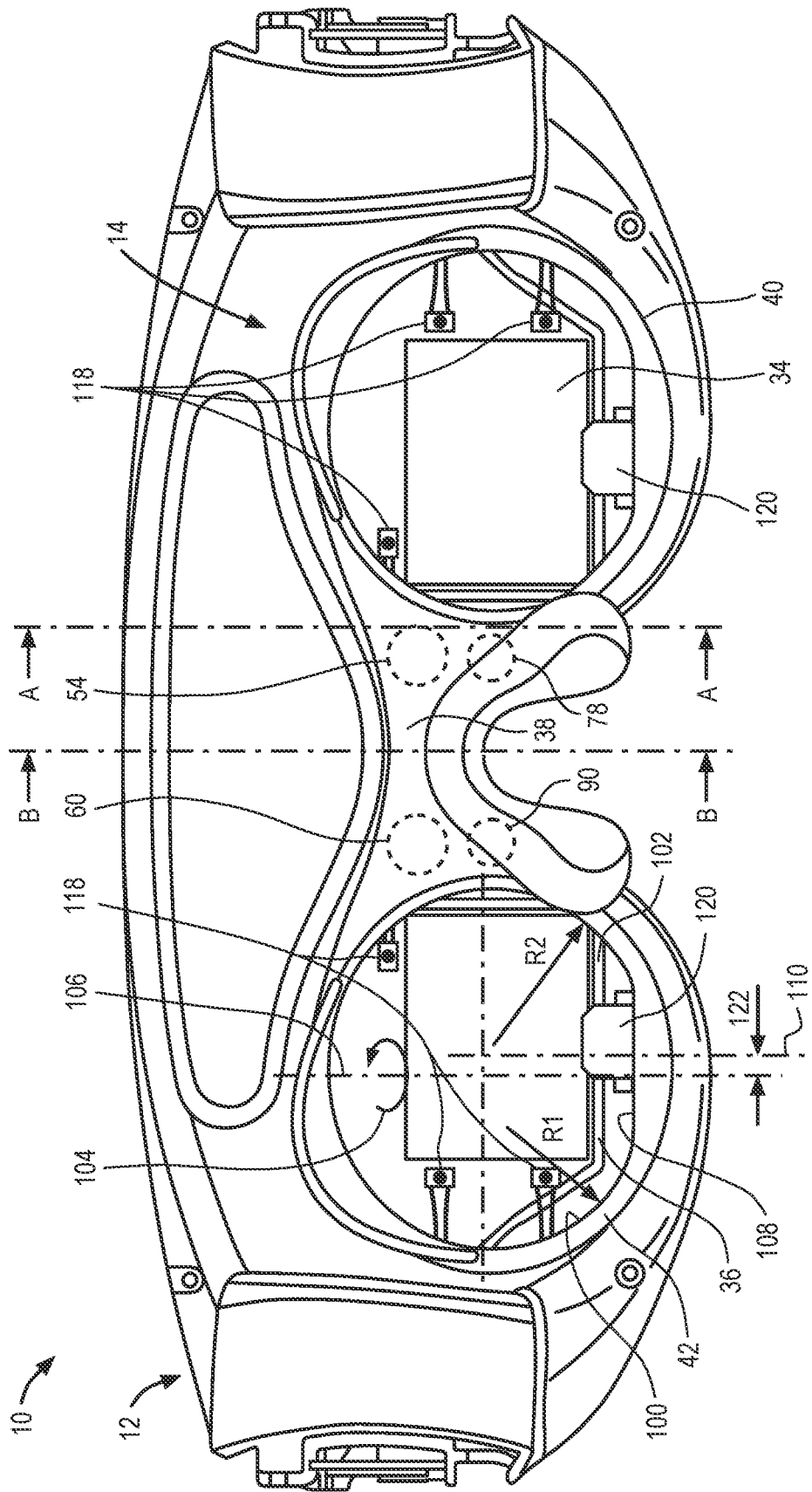
FIG. 3 is a front view of the visual perception device.

FIG. 1 illustrates a visual perception device 10 that includes a viewing device 12, a prescription insert 14, and an attachment system 16 that is used to secure the prescription insert 14 to the viewing device 12.

The viewing device 12 includes a viewing device frame 18, a first viewing component 20 and second viewing component 22. The first and second viewing components 20 and 22 may include lenses, waveguides, and other optical components or assemblies thereof. The first and second viewing components 20 and 22 are preferably partially or fully transparent such that a user can see through them to a scene.

The viewing device frame 18 includes a viewing device frame bridge 24, a first viewing device rim 26, a second viewing device rim 28, and a first temple piece 30. The viewing device frame bridge 24 connects the first and second viewing device rims 26 and 28 to one another. Each viewing device rim 26 and 28 defines a respective opening. The first viewing component 20 is mounted within the opening of the first viewing device rim 26. The second viewing component 22 is mounted within the opening of the second viewing device rim 28. The first temple piece 30 is attached to the second viewing device rim 28 on a side of the second viewing component 22 opposing the viewing device frame bridge 24. The first temple piece 30 may extend from viewing device frame 18 toward the user and contact at least a portion of the user's head. In the given embodiment, the first temple piece 30 extends in a direction that is approximately at right angles to a plane of the first and second viewing components 20 and 22; although a range of angles may also be possible depending on a width of a user's head.

A second temple piece (not shown) is attached to the first viewing device rim 26 on a side of the first viewing component 20 opposing the viewing device frame bridge 24. The second temple piece extends in a direction that is substantially parallel to the first temple piece 30.

In use, a user wears the viewing device 12 on their head. The first and second viewing components 20 and 22 are positioned in front of right and left eyes, respectively, of the user. The temple pieces 30 may form part of, or may be attached to, a strap or a rigid or semi-rigid band around the back of the head of the user to secure the viewing device frame 18 to the head of the user. The user can then view content that is transmitted from the first and second viewing components 20 and 22 to their eyes. Because the viewing device 12 is secured to their head, the user can move their head and the viewing device 12 moves with their head so that the first and second viewing components 20 and 22 always remain in front of their eyes.

Although an embodiment is described wherein the first temple piece 30 forms part of a strap or band around a head of a user, alternative systems can be used for attaching a viewing device to a head of a user. For example, an ear piece can be provided that anchors on an ear of a user instead of a strap or band that goes around the head of the user. Furthermore, although first and second viewing components 20 and 22 are described, aspects of the invention may find application in designs where only a single viewing component is provided.

The prescription insert 14 includes an insert frame 32, a first corrective component in the form of a first lens 34, and a second corrective component in the form of a second lens 36.

The insert frame 32 has an insert frame bridge 38 and first and second insert frame rims 40 and 42. The insert frame rims 40 and 42 are connected to one another via the insert frame bridge 38. The insert frame rims 40 and 42 define respective openings. The first and second lenses 34 and 36 are inserted into the respective openings of the first and second insert frame rims 40 and 42. The first and second lenses 34 and 36 are secured to the first and second insert frame rims 40 and 42 using a conventional mechanism such as an interference fit or the like.

The viewing device 12 and the prescription insert 14 are separate assemblies that can be obtained separately by a user. The first and second lenses 34 and 36 may be prescription lenses with corrections that are prescribed by an optician and are unique to the particular user. By providing the viewing device 12 and the prescription insert 14 separately to the user, there is no requirement to build corrective optics unique to the user into the viewing device 12. The user may, as their eyesight changes over time, replace the first and second lenses 34 and 36 with new lenses that are based on new corrective recommendations of new prescriptions. In another scenario, multiple users, each with different eyesight, may share a single viewing device while having a unique prescription insert customized to the specific eyesight of each user. In the latter scenario, the prescription inserts of the different users may be removably attached to the viewing device 12 using compatibly similar attachment systems as described herein.

The attachment system 16 includes first and second magnetic sets 50 and 52. The magnetic sets 50 and 52, together with other features, are used to removably secure the prescription insert 14 to the viewing device 12.

The first magnetic set 50 includes a first connector component in the form of a ferromagnetic component 54 and a second connector component in the form of a permanent magnet 56. The permanent magnet 56 is secured to the viewing device frame 18. A region where the permanent magnet 56 is secured to the viewing device frame 18 is referred to herein as a "first viewing device frame component 58". The permanent magnet 56 is inserted into an opening in the first viewing device frame component 58. The permanent magnet 56 may be secured to the first viewing device frame component 58 using an interference fit, an adhesive or the like. The permanent magnet may alternatively be installed from an opposing side and be secured with an adhesive.

The permanent magnet 56 is located in a stationary position relative to the viewing device frame 18. Its location and flux density can be accounted for when calculating potential electromagnetic interference between the permanent magnet 56 and electronics that reside within the viewing device frame 18. Thus, while it is possible to have a permanent magnet placed on the prescription insert and a ferromagnetic component placed on the frame, such an arrangement may require recalibration of on-board electronic components when a prescription insert is attached and removed to account for changes in the nearby magnetic field as a function of presence or absence of permanent magnets on the prescription insert.

The ferromagnetic component 54 is inserted into an opening within the insert frame bridge 38. The ferromagnetic component 54 may be secured to the insert frame bridge 38 using an interference fit, an adhesive or the like. The ferromagnetic component 54 is not a permanent magnet and is thus unlikely to attract magnetic particles when it is separated from the viewing device 12. A user that fits the first and second lenses 34 and 36 may thus do so without magnetic dust accumulating on the ferromagnetic component 54.

The second magnetic set 52 incudes a first connector component in the form of a ferromagnetic component 60 and second connector in the form of a permanent magnet 62. The permanent magnet 62 is secured to a second viewing device frame component 64 forming part of the viewing device frame 18. The ferromagnetic component 60 is secured to the insert frame bridge 38.

The ferromagnetic components 54 and 60 are located on opposite sides of a center line that divides the insert frame bridge 38 in half. Center points of the ferromagnetic components 54 and 60 are spaced from one another by the same distance as center points of the permanent magnets 56 and 62. The positioning of the ferromagnetic components 54 and 60 relative to the first and second lenses 34 and 36 is the same as the relative positioning of the permanent magnets 56 and 62 to the first and second viewing components 20 and 22 such that when the prescription insert is attached to viewing device, the first and second viewing components 20 and 22 are substantially concentric with the first and second lenses 34 and 36 and the permanent magnets 56 and 62 are substantially concentric with the ferromagnetic components 54 and 60. For example, a distance from a center point of the ferromagnetic component 54 to a center point of the first lens 34 is the same as a distance from a center point of the permanent magnet 56 to a center point of the first viewing component 20.

FIG. 2 further illustrates a first pin 78 and first guide opening 80. The first pin 78 is secured to and extends from the insert frame bridge 38. The first guide opening 80 is located within the viewing device frame bridge 24. The first pin 78 has a tip 82 and a body 84. The tip 82 has a slightly smaller cross section than the body 84.

In use, a user roughly aligns the prescription insert 14 with the viewing device 12 so that the first lens 34 is located over the first viewing component 20 and the second lens 36 is located over the second viewing component 22. The user then moves the prescription insert 14 closer to the viewing device 12. The first pin 78 is inserted into the first guide opening 80 when the insert frame bridge 38 approaches the viewing device frame bridge 24 and before the ferromagnetic component 54 contacts the permanent magnet 56. The smaller cross section of the tip 82 allows for slight misalignments between a center line of the first pin 78 and a center line of the first guide opening 80. As the first pin 78 is further inserted into the first guide opening 80, the body 84 enters the first guide opening 80. The body 84 is only slightly smaller than the first guide opening 80, which causes the center line of the first pin 78 to come into alignment with a center line of the first guide opening 80.

As the prescription insert 14 approaches the viewing device 12, the ferromagnetic components 54 and 60 enter into the magnetic fields of the permanent magnets 56 and 62, respectively. The magnetic fields of the permanent magnets 56 and 62 cause the ferromagnetic components 54 and 60 to become magnetic. The ferromagnetic components 54 and 60 are then attracted to the permanent magnets 56 and 62, respectively, by north-south magnetic attraction. As the user places the prescription insert 14 against the viewing device 12, the magnetic field created through the permanent magnet 56 and the ferromagnetic component 54 assist in further aligning the ferromagnetic component 54 with the permanent magnet 56. Similarly, the ferromagnetic component 60 aligns with the permanent magnet 62. The magnetic attraction between the ferromagnetic component 54 and the permanent magnet 56 causes the ferromagnetic component 54 to come into contact with the permanent magnet 56, at which time the first pin 78 is fully inserted into the first guide opening 80. The user then releases the prescription insert 14. The prescription insert 14 is secured to the viewing device 12 by way of the permanent magnets 56 and 62 and the ferromagnetic components 54 and 60. The first lens 34 is then aligned with the first viewing component 20 and the second lens 36 is aligned with second viewing component 22.

Interaction between the first pin 78 and an internal surface of the first guide opening 80 prevents movement in a direction 86 of the insert frame bridge 38 relative to the viewing device frame bridge 24. The insert frame bridge 38 is thus locked into place against movement in the direction 86 relative to the viewing device frame bridge 24. Should the viewing device 12 be bumped or be dropped, and relative forces are created between the insert frame bridge 38 and the viewing device frame bridge 24 in a direction parallel to the direction 86, the interaction between the first pin 78 and the first guide opening 80 will prevent movement of the insert frame bridge 38 relative to the viewing device frame bridge 24 in a direction in a same plane as the direction 86. For example, the interaction between first pin 78 and first guide opening 80 may substantially prevent relative motion between the prescription insert and the viewing device in any direction orthogonal to an axis of first pin 78.

Should the user wish to remove the prescription insert 14, the user holds on to a portion of the insert frame 32 and then moves the prescription insert 14 away from the viewing device 12. Such movement causes the ferromagnetic components 54 and 60 to separate from the permanent magnets 56 and 62 until their magnetic attraction is broken.

The advantages of having permanent magnets on the viewing device 12 and ferromagnetic components on the prescription insert 14 have been detailed above. Aspects of the invention may not be limited to such an arrangement. For example, it may be possible to have permanent magnets on the prescription insert 14 and ferromagnetic components on the viewing device 12. It may also be possible to only have permanent magnets and no ferromagnetic components. In each case there will be north-south magnetic attraction between first and second connector components on the prescription insert 14 and the viewing device 12 to secure the prescription insert 14 to the viewing device 12.

The invention has been described by way of example with first and second magnetic sets 50 and 52. More than one magnetic set allows for forces to be distributed across the prescription insert 14 and also assists in angular alignment of the prescription insert 14 relative to the viewing device 12. Aspects of the invention may find application in devices having more than two magnetic sets or only a single magnetic set. Additionally, while a symmetric system is shown, one of skill in the art will appreciate that the magnetic sets 50 and 52 may be arranged in any advantageous configuration to provide sufficient attraction forces between the prescription insert 14 and the viewing device 12. Moreover, while the magnetic sets 50 and 52 are shown placed medial to the viewing components 20 and 22 and lenses 34 and 36, it is possible to place the magnetic sets 50 and 52, or additional magnetic sets, above, below, or lateral to the viewing components 20 and 22 and lenses 34 and 36 as found to be advantageous for reduced electrical interference, more pleasing form factor, or other reasons.

The viewing device 12 further includes a head pad 70 secured to the viewing device frame bridge 24. The head pad 70 rests against a forehead of a user wearing the viewing device 12. The head pad 70 provides comfort to the user because it is generally made of a softer material than the viewing device frame 18 and also assists in insulating the user from heat generated by onboard electrical components. The head pad 70 also assists in securing the viewing device 12 to the head of the user, especially if the first temple piece 30 forms part of a strap surrounding the head of the user. The head pad 70 extends outwardly from the viewing device frame 18 towards the head of the user wearing the viewing device 12 which advantageously provides a shield for light that may otherwise enter from above between the viewing device frame bridge 24 and the forehead of the user wearing the viewing device 12.

The prescription insert 14 further includes first and second eye cups 72 and 74. The first eye cup 72 is secured to the first insert frame rim 40 and extends from the first insert frame rim 40 towards the head of the user wearing the viewing device 12. The first eye cup 72 prevents light that may enter from approximately a 12 o'clock position to approximately a 2 o'clock position between the first insert frame rim 40 and the head of the user wearing the viewing device 12. A shape of the first eye cup 72 cooperates with a shape of the head pad 70 to minimize or substantially eliminate light entering from above.

The second eye cup 74 is secured to and extends from the second insert frame rim 42. The second eye cup 74 prevents light from entering from approximately a 10 o'clock position to approximately a 12 o'clock position between the second insert frame rim 42 and a head of a user wearing the viewing device 12. The second eye cup 74 cooperates with the head pad 70 to minimize or substantially eliminate light from entering from above.

FIG. 2 shows the first magnetic set 50 after the ferromagnetic component 54 is magnetically attached to the permanent magnet 56 of the first magnetic set 50. The magnetic attraction between the ferromagnetic component 54 and the permanent magnet 56 resists removal of the insert frame bridge 38 in a direction 76 away from the viewing device frame bridge 24. The magnetic attraction between the ferromagnetic component 54 and the permanent magnet 56 of the first magnetic set 50 shown in FIGS. 1 and 2 and the magnetic attraction between the ferromagnetic component 60 and the permanent magnet 62 of the second magnetic set 52 shown in FIG. 1 is sufficient to hold the insert frame bridge 38 against the viewing device frame bridge 24 provided that the viewing device 12 is not excessively bumped or is not dropped onto the ground, for example. The magnetic attraction is still sufficiently weak to allow for a user to remove the prescription insert 14 from the viewing device 12. The magnets are typically Grade N52 magnets that have a diameter of 4 mm and a height of 2 mm and impart approximately 0.94 lbs. force each.

The attachment system 16 thus secures the insert frame bridge 38 to the viewing device frame bridge 24 and prevents movement of the insert frame bridge 38 relative to the viewing device frame bridge 24 in the directions 76 and 86. The first pin 78 and the first guide opening 80 have center lines that extend in a direction permitting a user to remove the insert frame bridge 38 from the viewing device frame bridge 24. When the user thus breaks the magnetic attraction between the ferromagnetic component 54 and the permanent magnet 56, the first pin 78 withdraws from the first guide opening 80 as the insert frame bridge 38 is removed from the viewing device frame bridge 24.

As shown in FIG. 1, a second guide opening 88 is provided within the viewing device frame bridge 24. The first and second guide openings 80 and 88 are located on opposite sides of a vertical center line of the viewing device frame bridge 24. The first pin 78 is aligned with the first guide opening 80. The prescription insert 14 further includes a second pin 90. The first and second pins 78 and 90 are located on opposite sides of vertical center line of the insert frame bridge 38. A distance between center points of the first and second guide openings 80 and 88 is the same as a distance between center lines of the first and second pins 78 and 90. The first and second pins 78 and 90 engage simultaneously with the first and second guide openings 80 and 88, respectively, when the prescription insert 14 is moved towards the viewing device 12.

The inclusion of two pins 78 and 90 assists in distributing forces across the prescription insert 14 and prevents angular misalignment between the prescription insert 14 and the viewing device 12. It will however be understood that a single pin and a single guide opening may provide an interlocking arrangement and that more than two such arrangements may further distribute stresses across the prescription insert 14. It will also be understood that the number of pins need not match the number of magnetic sets. For example, there may be more or fewer pins than magnetic sets.

The viewing device 12 further includes a nose piece 92 that is secured to the viewing device frame bridge 24. The nose piece 92 is connected to the viewing device frame bridge 24 before or after the prescription insert 14 is attached to the viewing device 12. A lower surface of the insert frame bridge 38 and an upper surface of the nose piece 92 are complementary in shape, which allows for the insert frame bridge 38 to be positioned over the nose piece 92 during installation. A lower surface of the nose piece 92 is shaped to fit over a nose of the user wearing the visual perception device 10. The material of the nose piece 92 may be selected to have some elasticity or compliance such that a variety of nose shapes may be accommodated while maintaining a desired comfort level. The nose piece 92 has first and second nose tabs 94 and 96 that contact opposing sides of the nose of the user wearing the visual perception device 10.

As shown in FIG. 3, the second insert frame rim 42 and the second lens 36 have complementary shapes that allow for the second lens 36 to be inserted into the second insert frame rim 42 in a first orientation with a first side of the second lens 36 facing towards the second viewing component 22 (see FIG. 1) and disallow the second lens 36 from being inserted into the second insert frame rim 42 in a second orientation wherein the first side of the second lens 36 faces away from the second viewing component 22. The second lens 36 can thus not be rotated in a direction 104 about a vertical center line 106 and still fit. In particular, the shape of the second insert frame rim 42 includes first and second curves 100 and 102 that have different radiuses, R1 and R2, that match respective radiuses of the second lens 36 in the first orientation and prevent insertion of the second lens 36 into the second insert frame rim 42 when the second lens 36 is rotated in a direction about a vertical axis into the second orientation. The second insert frame 42 has a flat section 108. A line 110 that extends at right angles from a center point of the flat section is offset by a distance 112 from a center point 114 of the second lens 36. The positioning of the flat section 108 relative to the center point 114 further prevents insertion of the second lens 36 into the second insert frame rim 42 when in the second orientation. One of skill in the art will appreciate that various asymmetries and/or geometries may be built into lenses and insert frame rims to prevent improper orientation of the lenses, either upside down or switched between the left and right.

Proper alignment of spherical and cylindrical corrective features of the second lens 36 is ensured by permitting the second lens 36 to be inserted into the second insert frame rim 42 in the first orientation, but not in the second orientation. The first lens 34 and the first insert frame rim 40 have complementary shapes that allow for the first lens 34 to be inserted into the first insert frame rim 40 when the first lens 34 is in a first orientation, but disallow insertion of the first lens 34 into the first insert frame rim 40 when the first lens 34 is in a second orientation with a surface thereof that should face towards the first viewing component 20 (see FIG. 1) facing away from the first viewing component 20.

The complementary features of the first and second lenses 34 and 36 with respect to the first and second insert frame rims 40 and 42 thus prevent reversed insertion of the first and second lenses 34 and 36. The features are particularly useful because the first and second lenses 34 and 36 are premanufactured to prescribed proportions and cannot easily be reshaped after they have been inserted into the first and second insert frame rims 40 and 42. It should however be understood that aspects of the invention may find application where corrective components other than lenses with fixed corrective dimensions are used. For example, aspects of the invention may find application using corrective components such as adaptive lenses or corrective components using liquid crystal display technology. Such corrective components may or may not have the ability to adjust corrective features after they have been installed. Complementary shapes between such corrective components and the insert frame rims into which they are installed may or may not require complementary shapes that prevent reversed installation, depending on whether such corrective components can adjust for spherical and cylindrical alignment of corrective features.

The viewing device 12 includes a plurality of infrared emitters 118 and two eye tracking cameras 120. The infrared emitters 118 are positioned to emit infrared light through the first and second lenses 34 and 36. The eye tracking cameras 120 are positioned to receive infrared light through the first and second lenses 34 and 36. The ferromagnetic components 54 and 60 and the first and second pins 78 and 90 are located behind the insert frame bridge 38 and are not visible in the view of FIG. 3. The insert frame 32 is shaped to hide the first and second pins 78 and 90 and the ferromagnetic components 54 and 60 while allowing light to transmit from the infrared emitters 118 through the first and second insert frame rims 40 and 42 and for infrared light to transmit through the first and second insert frame rims 40 and 42 to the eye tracking cameras 120.

Figure 4:
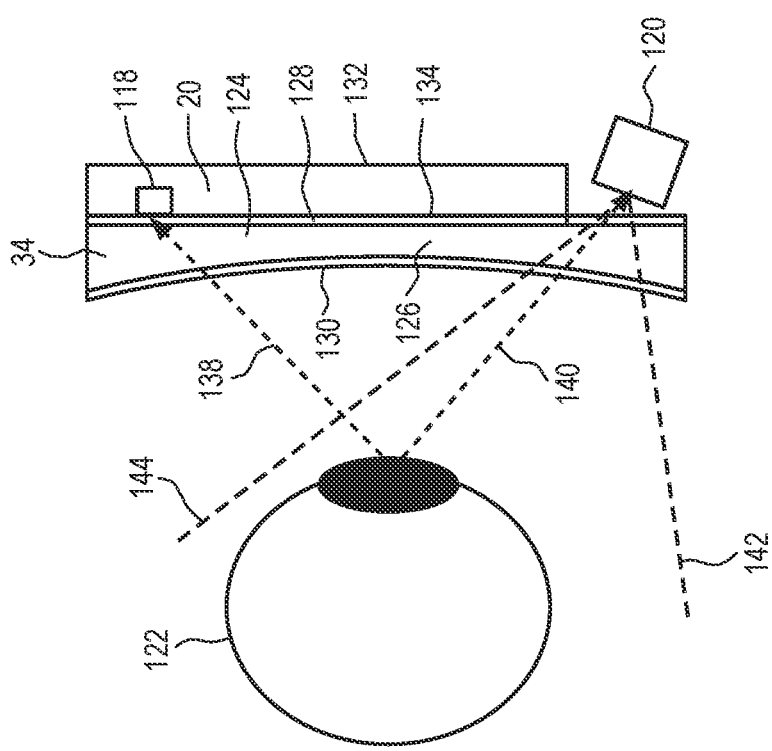
FIG. 4 is a side view illustrating optical components of the visual perception device.

FIG. 4 illustrates the positioning of one of the infrared emitters 118, one of the eye tracking cameras 120, the first lens 34, the first viewing component 20 and an eye 122 relative to one another. The first lens 34 has a first side 124 and second side 126 opposing the first side 124. The infrared emitter 118 and the eye tracking camera 120 are located on the first side 124 of the first lens 34. The eye 122 is located on the second side 126 of the first lens 34.

The first lens 34 is made of acrylic glass, thermoset, or thermoplastic material or another material that reflects infrared light or a large fraction of infrared light. The first and second infrared pass filters 128 and 130 are made of a material that is conducive to passing infrared light.

The first viewing component 20 has first and second opposing surfaces 132 and 134. The first and second opposing surfaces 132 and 134 are planar surfaces that are located in parallel planes relative to one another such that light entering eyes of a user through the viewing component 20 has little to no distortion. The first side 124 of the first lens 34 is a planar surface. Because the first side 124 of the first lens 34 is a planar surface and the second surface 134 of the first viewing component 20 is also a planar surface, the first lens 34 can be positioned as close as possible to the first viewing component 20.

The second side 126 of the first lens 34 has a concave shape that can be adjusted to accommodate for various myopic vision correction prescriptions. The concave shape of the second side 126 allows for the first lens 34 to be located between the eye 122 and the first viewing component 20 while still allowing sufficient space between the eye 122 and the first lens 34 without danger that the first lens 34 may come into contact with the eye 122 or eyelashes during blinking.

The combination of the planar first side 124 and the concave second side 126 of the first lens 34 thus allows for the first lens 34 to be added between the first viewing component 20 and the eye 122. Another lens shape, for example where the first side 124 is convex may result in a lens shape that may be too close to the eye 122.

In use, the infrared emitter 118 emits electromagnetic waves in the form of infrared light 138. The first infrared pass filter 128 absorbs the infrared light 138. The infrared light 138 transmits through the first infrared pass filter 128 into the first lens 34. The first lens 34 absorbs more of the infrared light 138 due to the first infrared pass filter 128 than without it.

The infrared light 138 then transmits from the first lens 34 through the second infrared pass filter 130, and then through an air space between the second infrared pass filter 130 and the eye 122. The infrared light 138 then reflects off a surface of the eye 122 as infrared light 140.

The infrared light 140 then travels through the airspace between the eye 122 and the second infrared pass filter 130. The second infrared pass filter 130 absorbs the infrared light 140. The infrared light 140 travels through the second infrared pass filter 130 into the first lens 34. The first lens 34 absorbs more of the infrared light 140 due to the second infrared pass filter 130 than without it.

The infrared light 140 then travels out of the first lens 34 and through the first infrared pass filter 128 to the eye tracking camera 120. The eye tracking camera 120 then detects the infrared light 140. The eye tracking camera 120 also receives infrared light, as represented by infrared light rays 142 and 144, from other locations on the eye 122. The infrared light that is received by the eye tracking camera 120 originates from the infrared emitter 118 shown in FIG. 4 and the other infrared emitters 118 that are visible through the first insert frame rim 40 in FIG. 3. Eye movement is tracked through changes in infrared light source reflecting off eye. The eye tracking camera 120 captures an image of the eye 122 from the infrared light that is reflected. The image of the eye 122 and the movement of infrared light reflections off of the eye as captured by the eye tracking camera 120 may change as the eye 122 moves. The changing infrared light reflections correlate to movements and positions of the eye 122 such that eye position can be inferred from reflection patterns captured by eye tracking camera 120.

Figure 8:
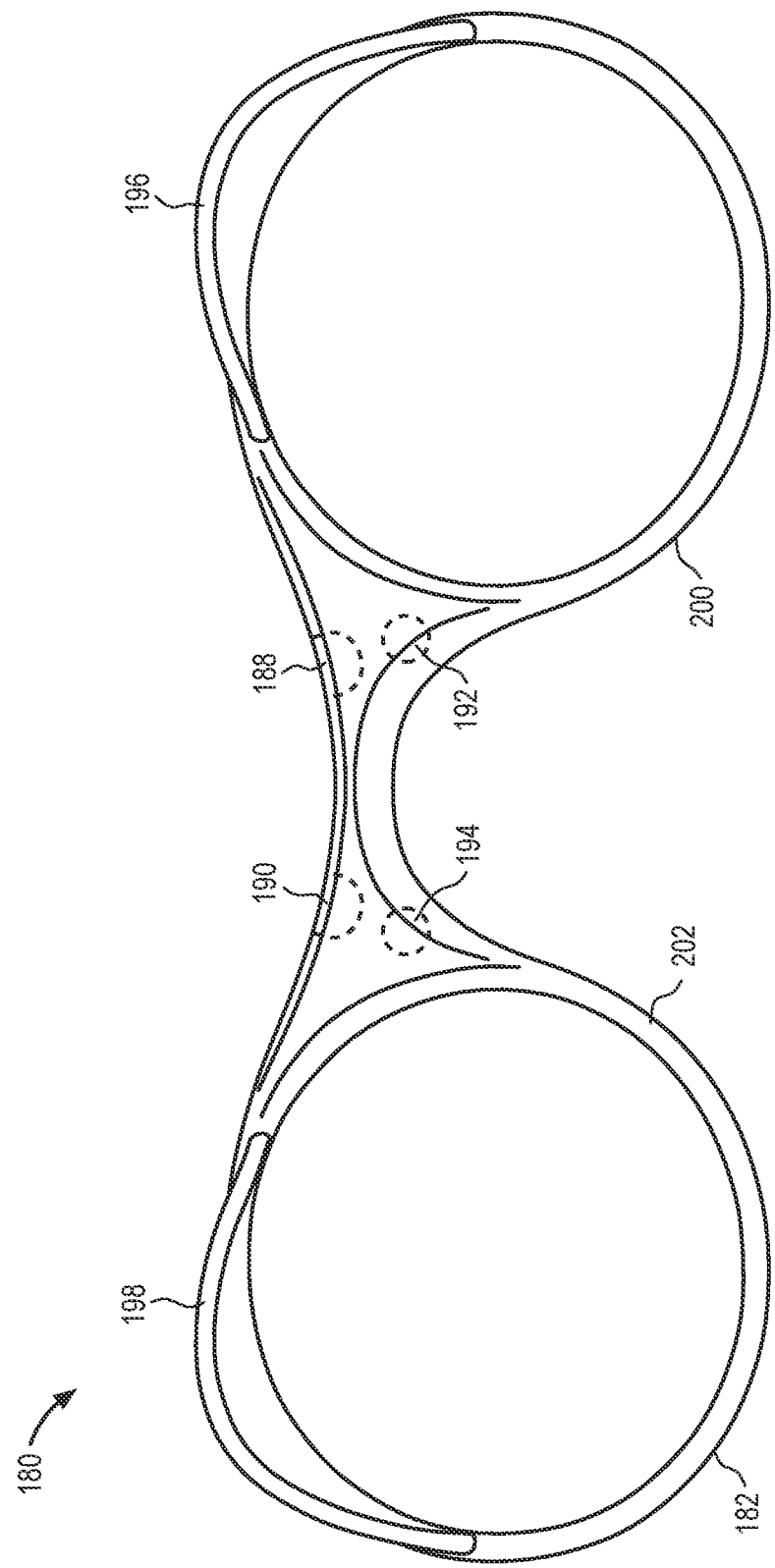
FIG. 8 is a front view of a nonprescription insert that can be used instead of the prescription insert of FIG. 1.

FIGS. 5A and 8 illustrate how the first lens 34 corrects for myopia when viewing a real object. In FIG. 5A, the first lens 34 is not installed. A first component of light 146 travels from a real object (not shown) through the first viewing component 20 to the eye 122. A lens 148 of the eye 122 refracts the first component of light 146 so as to focus the first component of light 146 at a focal point 150. In an eye that has perfect vision, the focal point is precisely on the retina in such an eye. In myopic vision, such as for the eye 122, the focal point 150 is located between a retina 152 and the lens 148 of the eye 122. The light begins to fan out as it moves from the focal point 150 toward the retina 152 such that when the first component of light 146 reaches the retina 152, the retina 152 detects an out-of-focus blurred image.

FIG. 5B illustrates the effect of the first lens 34 to correct for the myopic vision in FIG. 5A. The first lens 34 refracts the first component of light 146 before the first component of light 146 reaches the lens 148 of the eye 122. When the lens 148 of the eye 122 refracts the light, the lens 148 focuses the light at a focal point 154 on the retina 152. The first lens 34 thus corrects for myopic vision such that the first component of light 146 is in focus to the viewer.

FIG. 6A illustrates further components of the viewing device 12, including a data channel 158 and a projector 160. The projector 160 is secured to the viewing device frame 18 in FIG. 1.

In use, the data channel 158 carries data representing an image. The projector 160 is connected to the data channel 158 and converts the data presenting the image into a second component of light 162. The projector 160 is positioned to direct the second component of light 162 into the first viewing component 20. The second component of light 162 enters the first viewing component 20 and the first viewing component 20 then acts as a wave guide through which the second component of light 162 travels while being reflected within the first viewing component 20. The second component of light 162 exits the first viewing component 20 through a pupil 164 towards the lens 148 of the eye 122. The lens 148 refracts the second component of light 162 and focuses the second component of light 162 at a focal point 166. Because of the myopic conditions of the eye 122, the focal point 166 is spaced from the retina 152 and located between the retina 152 and the lens 148 of the eye 122.

The user perceives a rendered image at a distance behind the first viewing component 20 due to the shaped wavefront of the image being transmitted from the pupil 164 toward the eye 122. The shape of the wavefront determines how far away the user will perceive the virtual image to be. As a user focuses on the virtual image, the natural accommodation/vergence response occurs to bring the virtual image into focus at the perceived depth. However, because of the myopic conditions of the eye 122, if the distance of the virtual image is outside of a range that the lens 148 of the eye 122 can correct, an out-of-focus blurred virtual image will be seen by the user.

As shown in FIG. 6B, the second lens 36 refracts the second component of light 162 before the second component of light 162 reaches the lens 148 of the eye 122. When the lens 148 of the eye 122 again refracts the light, the light focuses at a focal point 166 on the retina 152.

The first and second components of light 146 and 162 fall on the retina 152 simultaneously. As a result, the user sees the real object and the image simultaneously. The first lens 34 brings both the real object and the image into focus at the same time, assuming the light is originating, or appears to be originating, from the same depth from the eyes.

Figure 7:
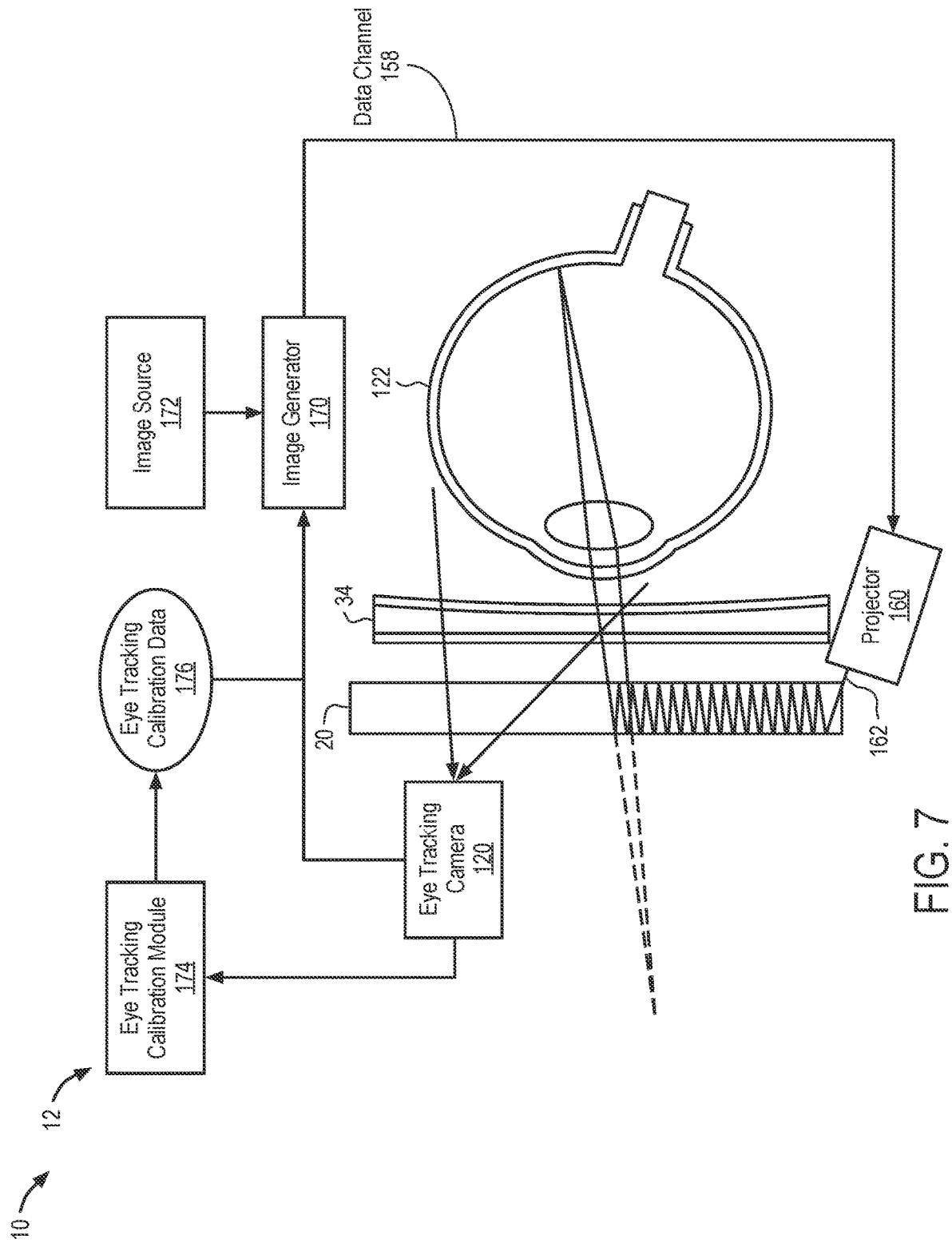
FIG. 7 is a side view and a block diagram illustrating image generation and eye tracking components of the visual perception device.

FIG. 7 illustrates further components of the viewing device 12, including an image generator 170, an image source 172, an eye tracking calibration module 174 and eye tracking calibration data 176.

The image generator 170 is connected to the eye tracking camera 120 and to the image source 172. The image source may, for example, be a static image, a video stream or image data that is being captured in real time. The image generator 170 utilizes the image from the image source 172 and data from the eye tracking camera 120 to generate image data. The image generator 170 provides the image data through the data channel 158 to the projector 160.

The eye tracking camera 120 tracks movement of the eye 122 for purposes of determining an orientation of the eye 122. The image generator 170 modifies the image from the image source 172 based on data from the eye tracking camera 120. The first viewing component 20 may for example have a plurality of pupils and the image generator 170 may provide more light to one pupil than to another pupil of the first viewing component 20 depending the orientation of the eye 122. The eye tracking cameras 120 of both eyes 122 can jointly determine an orientation of the eyes 122 relative to one another. Such data may facilitate a reduction in accommodation-and-vergence mismatches by rendering the image at a particular field of depth.

The eye tracking calibration module 174 is used to generate the eye tracking calibration data 176 before the image generator 170 is used to generate an image for a user. The eye tracking calibration module 174 utilizes data from the eye tracking camera 120 to generate the eye tracking calibration data 176. The eye tracking camera 120 receives image data of the eye 122 through the first lens 34. The image data that is received by the eye tracking camera 120 is different when the first lens 34 is included than when the first lens 34 is absent. The eye tracking calibration module 174 is configured to generate the eye tracking calibration data 176 without the inclusion of the first lens 34 and to compensate for the inclusion for the first lens 34 when it is present. The image generator 170 utilizes the eye tracking calibration data 176 to generate the image data for purposes of providing to the data channel 158. The image generator 170 thus generates substantially the same image data irrespective of whether the eye tracking calibration data 176 is generated when the first lens 34 is absent or included.

The first lens 34 is a plano-concave lens. As described above, a plano-concave lens is suitable for correcting a refractive error duo to myopia and can easily fit between the first viewing component 20 and the eye 122 without much danger that the first lens 34 will contact the eye 122. Aspects of the invention may find application when another lens is used, for example a biconvex, plano-convex, convex-concave, meniscus, or a biconcave lens. In addition to myopia, a lens that corrects for a refractive error due to astigmatism may fit easily between the first viewing component 20 and the eye 122. Aspects of the invention may also find application for corrections of other refractive errors, such as hyperopia or presbyopia without departing from such aspects of the invention.

FIG. 8 illustrates a nonprescription insert 180, according to another embodiment of the invention. The nonprescription insert 180 includes an insert frame 182, ferromagnetic components 188 and 190, first and second pins 192 and 194 and first and second eye cups 196 and 198. The nonprescription insert 180 is similar to the prescription insert 14 of FIG. 1 with respect to these features.

The nonprescription insert 180 does not have any lenses that are installed. As such, there is no danger that any lenses may be inadvertently reversed during installation. The insert frame 182 has first and second insert frame rims 200 and 202 that do not have the features of the first and second insert frame rims 40 and 42 in FIG. 1 that prevent reversed insertion of the first and second lenses 34 and 36.

The prescription insert 14 and the nonprescription insert 180 are fully interchangeable. A user can remove the prescription insert 14 from the viewing device 12 by overcoming the magnetic connection force and can then install the nonprescription insert 180 in place of the prescription insert 14.

Figure 9:
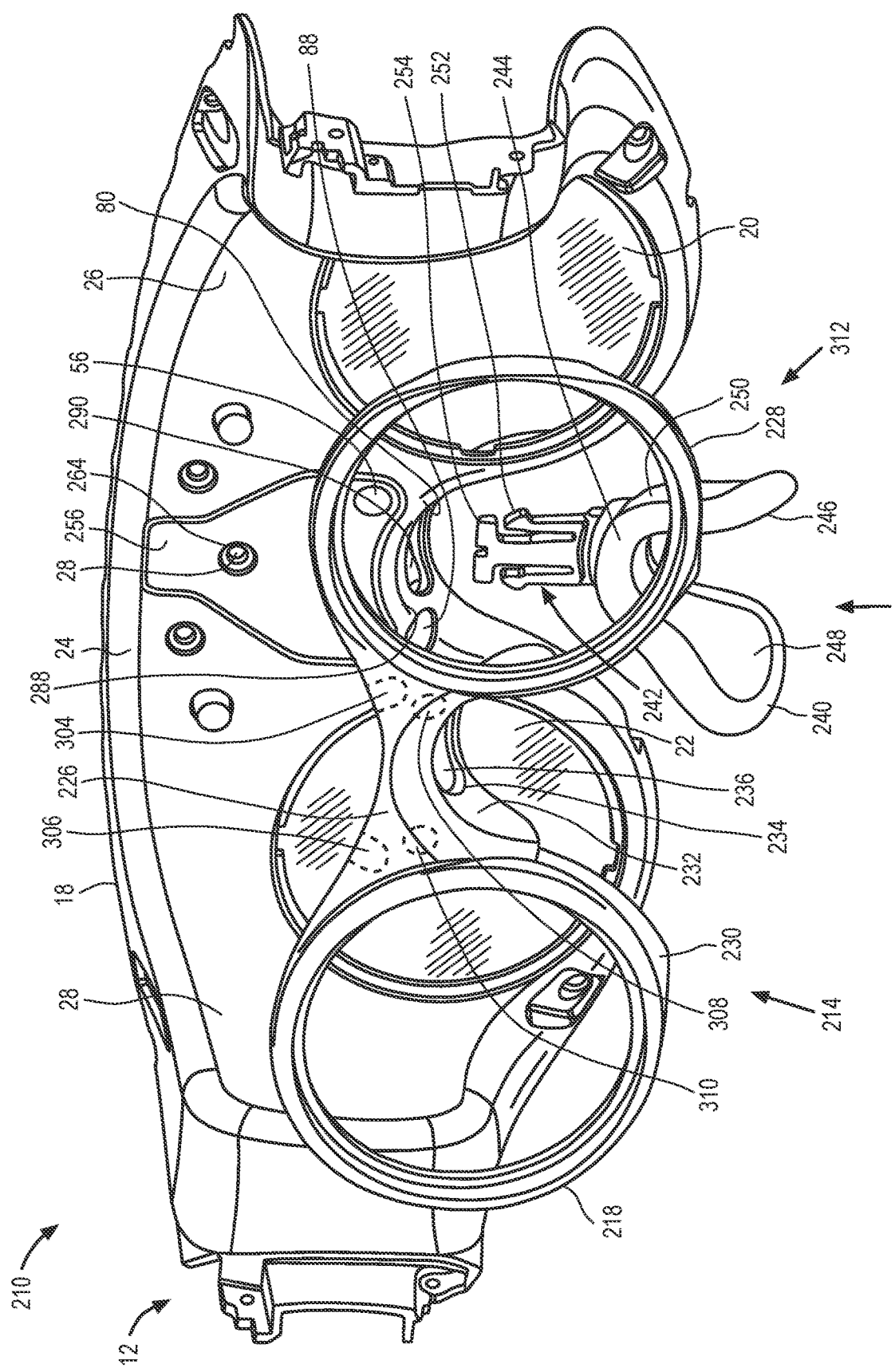
FIG. 9 is perspective view of a visual perception device having an attachment system that includes a nose piece that is used to attach a nonprescription insert to a viewing device.

FIG. 9 illustrates a visual perception device 210, according to another embodiment of the invention, that includes the viewing device 12 of FIG. 1, a nonprescription insert 214, and a nose piece 216 that is used to secure the nonprescription insert 214 to the viewing device 212. The nonprescription insert 214 is shown by way of example. It should however be understood that a prescription insert may instead be illustrated.

The nonprescription insert 214 includes an insert frame 218. The insert frame 218 includes an insert frame bridge 226 and first and second insert frame rims 228 and 230, respectively. The nonprescription insert 214 is similar to the nonprescription insert 180 in FIG. 8 with respect to the insert frame 218 in its construction and functioning.

The nonprescription insert 214 further includes a tab 232 extending from the insert frame bridge 226. The tab 232 has a lower surface 234 that is curved. A through opening 236 is formed through the tab 232. The through opening 236 is formed through only a portion of the tab 232, thus leaving a substantial portion of the lower surface 234 of tab 232 in place.

The nose piece 216 includes a nose pad 240 and a locking component 242.

The nose pad 240 includes a nose bridge 244 and first and second nose tabs 246 and 248. The nose bridge 244 extends into the first and second nose tabs 246 and 248 to define an inverted channel shape.

The locking component 242 is secured to the nose bridge 244 and extends from an upper surface 250 of the nose bridge 244. The locking component 242 defines a first locking formation 252. The nose piece 216 further has elastic pads 254 on the locking component 242.

FIG. 10 shows the nose piece 216 and an anchor piece 256 in more detail. The anchor piece 256 has a backing plate 258, a second locking formation 260, and a stopper portion 262. The second locking formation 260 and the stopper portion 262 are integrally formed with the backing plate 258. The backing plate 258 further has a retaining opening 264.

In FIG. 9, the anchor piece 256 fits within a complementary recess of the viewing device frame bridge 24. A fastener 280 is inserted through the retaining opening 264. The fastener 280 is then screwed into the viewing device frame bridge 24, which secures the anchor piece 256 to the viewing device frame bridge 24. The anchor piece 256 thus forms part of the viewing device 12 and is mounted to the viewing device frame bridge 24 before the nonprescription insert 214 and the nose piece 216 are mounted to the viewing device 12.

The viewing device frame bridge 24 has a lower surface 288 defining a through opening 290. The through opening 290 takes up only a portion of the real estate of the lower surface 288.

In use, a user locates the nonprescription insert 214 against the viewing device 12 with the first and second insert frame rims 228 and 230 positioned over the first and second viewing components 20 and 22, respectively. An upper surface of the insert frame bridge 226 and the lower surface 288 of the viewing device frame bridge 24 are located against each other. The through opening 236 in the insert frame bridge 226 is aligned with the through opening 290 in the viewing device frame bridge 24. The user then inserts the locking component 242 of the nose piece 216 through the through openings 236 and 290.

Referring again to FIG. 10, the first locking formation 252 includes first and second lever arms 294 and 296. Each lever arm 294 or 296 has a respective angular surface 298 and a respective clip formation 300. The angular surfaces 298 contact inner surfaces of the second locking formation 260. Further insertion of the first and second lever arms 294 and 296 into the second locking formation 260 causes the first and second lever arms 294 and 296 to bend towards one another. When the first and second lever arms 294 and 296 are further inserted into the second locking formation 260, the elastic pads 254 come into contact with the stopper portion 262. The elastic pads 254 then compress to allow further insertion of the first and second lever arms 294 and 296 into the second locking formation 260.

As shown in FIG. 11, when the clip formations 300 exit the second locking formation 260, the first and second lever arms 294 and 296 expand outwardly due to their elastic properties. The clip formations 300 then reside over the second locking formation 260. The clip formations 300 resist removal of the locking component 242 out of the second locking formation 260.

The elastic pads 254 create a force F on a force transfer member 302 of the locking component 242. The force F keeps the clip formations 300 against the second locking formation 260 to prevent rattling of the nose piece 216.

Referring to FIG. 9, the upper surface 250 of the nose pad 240 is located against the lower surface 234 of the tab 232. With the nose piece 216 firmly secured to the viewing device 12, the nose pad 240 of the nose piece 216 holds the nonprescription insert 214 in position with the tab 232 sandwiched between the upper surface 250 of the nose pad 240 and the lower surface 288 of the viewing device frame bridge 24. A similar arrangement can be used for a prescription insert of the kind described above.

FIG. 9 also illustrates the permanent magnet 56. The permanent magnet 56 forms part of a first magnetic set that includes the permanent magnet 56 and a ferromagnetic component 304. The embodiment of FIG. 9 may include a second magnetic set that includes the permanent magnet 62 of FIG. 1 and a ferromagnetic component 306. The nonprescription insert may also have first and second pins 308 and 310 that engage with the first and second guide openings 80 and 88. The magnetic sets together with the first and second pins 308 and 310, the first and second guide openings 80 and 88 and the nose piece 216 form an attachment system that secures the nonprescription insert 214 to the viewing device 12.

Referring again to FIG. 11, each clip formation 300 has an inclined surface 316. The inclined surface 316 is sufficient to retain the clip formation 300 in position against the second locking formation 260. A slight pull on the nose piece 216 will not cause the clip formation 300 to move. The clip formation 300 thus resists disengagement of the first locking formation 252 from the second locking formation 260.

A larger force exerted by a user on the nose piece 216 causes the inclined surface 316 to slide on the second locking formation 260. Such sliding movement of the inclined surfaces depresses the clip formations 300 towards one another and bends the first and second lever arms 294 and 296. The user can then remove the first locking formation 252 from the second locking formation 260.

Figure 13:
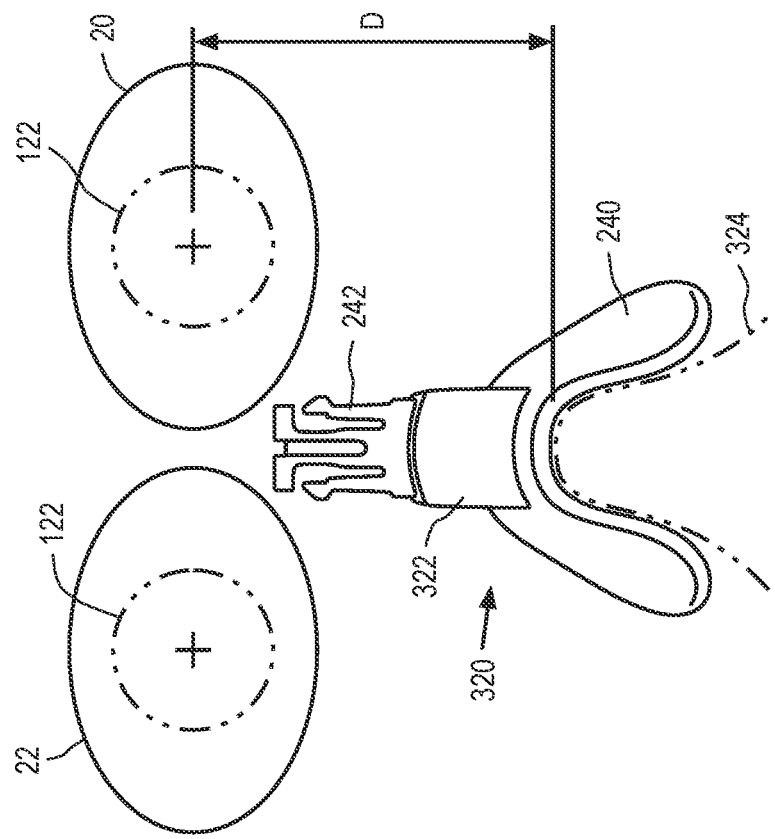
FIG. 13 is a front view illustrating the use of a longer nose piece than in FIG. 12.
Figure 12:
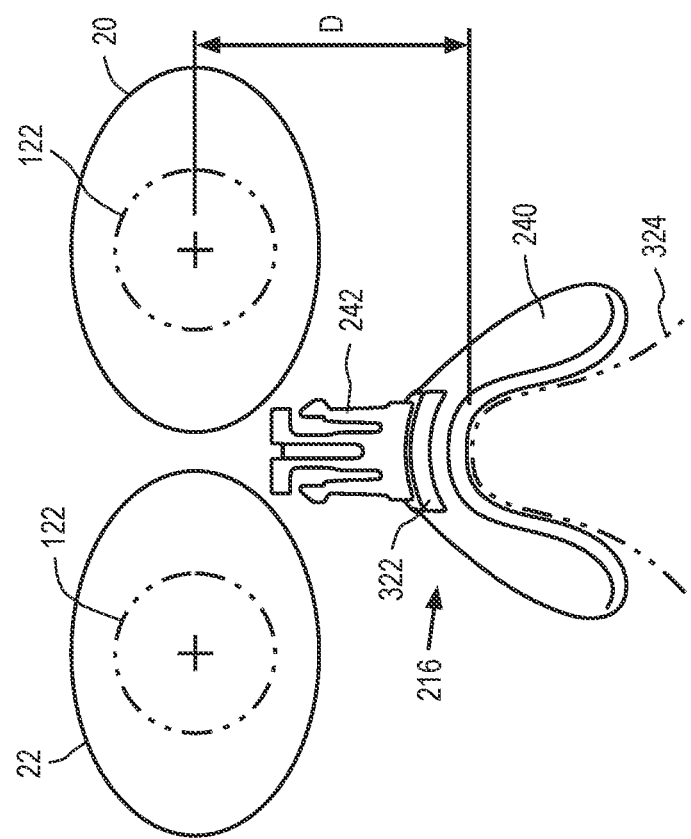
FIG. 12 is a front view illustrating the use of a short nose piece.

FIGS. 12 and 13 show two nose pieces, namely the nose piece 216 of FIG. 9 and a nose piece 320. The nose pieces 216 and 320 have similar elements and like reference numerals indicate like or similar components. Each nose piece 216 and 320 has a respective stem 322 connecting the nose pad 240 to the locking component 242 thereof. The first and second viewing components 20 and 22 have calibration targets that are usually in the center of the respective viewing component. When the nose pieces 216 and 320 are installed, a vertical distance d is defined between the calibration point of the first viewing component 20 and a lower surface of the nose pad 240 of the respective nose piece 216 or 320. The vertical distance d is smaller when the nose piece 216 is installed than when the nose piece 320 is installed. Facial features of a user are indicated in dotted lines, including their eyes 122 and their nose 324. The nose pieces 216 or 320 are selected so that the vertical distance d matches a vertical distance between a center point of a respective user's eyes 122 and the bridge of their nose where the nose pad 240 rests.

A plurality of nose pieces may be provided for the visual perception device 10. For example, four nose pieces may each have a stem that has a different length. The different nose pieces accommodate different facial feature shapes of different users. The calibration locations on the first and second viewing components 20 and 22 are aligned with center point of the eyes 122 of the respective users irrespective of their facial features, thus resulting in more accurate calibration. The nose pieces accommodate a range of facial features, shapes and sizes while maintaining optimal eye piece positioning for each user so that visual content can be perceived by the user.

Figure 14:
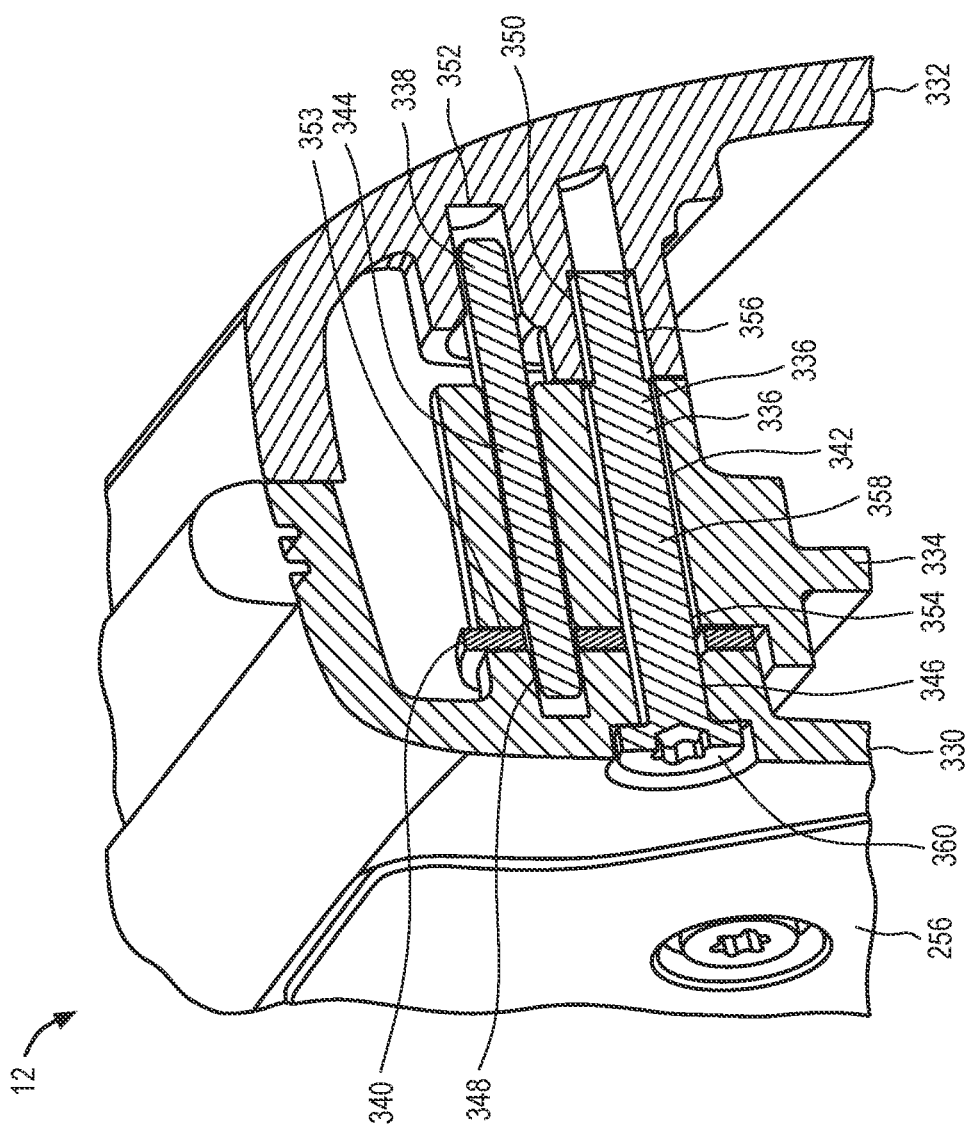
FIG. 14 is a perspective view in cross-section on A-A in FIG. 3.

FIG. 14 illustrates further components of the viewing device 12, including a shell comprised of a front housing 330 and a back housing 332, a bionicle frame 334, a fastener 336, a guide pin 338, and a pliable member 340.

The bionicle frame 334 is made out of metal. The first and second viewing components 20 and 22 are secured to the bionicle frame 334. The first and second viewing components 20 and 22 together with the bionicle frame 334 and other components such as electronic sensors and the like make up a subassembly separate from the other components shown in FIG. 14. The components secured to the bionicle frame 334 are sensitive to sudden impact stresses that may cause damage to these components or move them out of position. The bionicle frame 334 defines a fastener opening 342 and a guide pin opening 344.

The anchor piece 256 is mounted directly to the front housing 330. The front housing 330 has a fastener opening 346 and a guide pin opening 348.

The back housing 332 has a threaded fastener opening 350 and a guide pin opening 352.

The pliable member 340 is a springable member that is made of an elastomeric material. The pliable member 340 has a guide pin opening 352 and a fastener opening 354.

The guide pin 338 is inserted through the guide pin openings 344 and 352. An interference fit is created between the guide pin opening 344 and the guide pin 338. The pliable member 340 is positioned adjacent the bionicle frame 334 with the guide pin opening 352 aligned with the guide pin opening 344 and with the fastener opening 354 aligned with the fastener opening 342.

A rear end of the guide pin 338 is inserted into the guide pin opening 352 of the back housing 332. A front end of the guide pin 338 is inserted into the guide pin opening 348 in the front housing 330. The front housing 330 and back housing 332 are brought together in this manner and contact each other along their perimeters. The bionicle frame 334 is held within the shell defined by the front housing 330 and the back housing 332. The pliable member 340 is located between the front housing 330 and the bionicle frame 334. Opposing sides of the pliable member 340 make contact with the front housing 330 and with the bionicle frame 334.

The fastener 336 has a threaded end 356 that is inserted through the fastener openings 346, 354 and 342. The threaded end 356 is then screwed into the threaded fastener opening 350. The fastener 336 has a shank 358 located within the fastener opening 342. A relatively large tolerance is provided between the fastener opening 342 and the shank 358. The fastener 336 has a head 360 that is larger than the fastener opening 346 so as to rest on a surface of the front housing 330. The threaded end 356 and the head 360 at opposing ends of the fastener 336 secure the fastener 336 to the front housing 330 and the back housing 332, and thus secures the front housing 330 and the back housing 332 to one another with the bionicle frame 334 and the pliable member 340 between the front housing 330 and the back housing 332.

As mentioned before, the nose piece is secured to the anchor piece 256. When the user moves their head, the user transfers forces from their nose through the nose piece to the anchor piece 256. These forces are created due to acceleration and jerk. The anchor piece 256 transfers the forces to the front housing 330. The front housing 330 transfers the forces to the pliable member 340. The pliable member 340 compresses or expands so that the forces are not transferred from the front housing 330 to the bionicle frame 334, or to reduce the forces that are transferred. Because of the relatively large tolerance between the fastener opening 342 and the fastener 336, the bionicle frame 334 is permitted to move relative to the fastener 336. The bionicle frame 334 is secured to the guide pin 338 through an interference fit, which causes the guide pin 338 to move with the bionicle frame 334 relative to the front housing 330. A length of the guide pin 338 is shorter than a distance defined between outer limits of the guide pin openings 348 and 352, which allows the guide pin 338 to move relative to the front housing 330 and the back housing 332.

Figure 15:
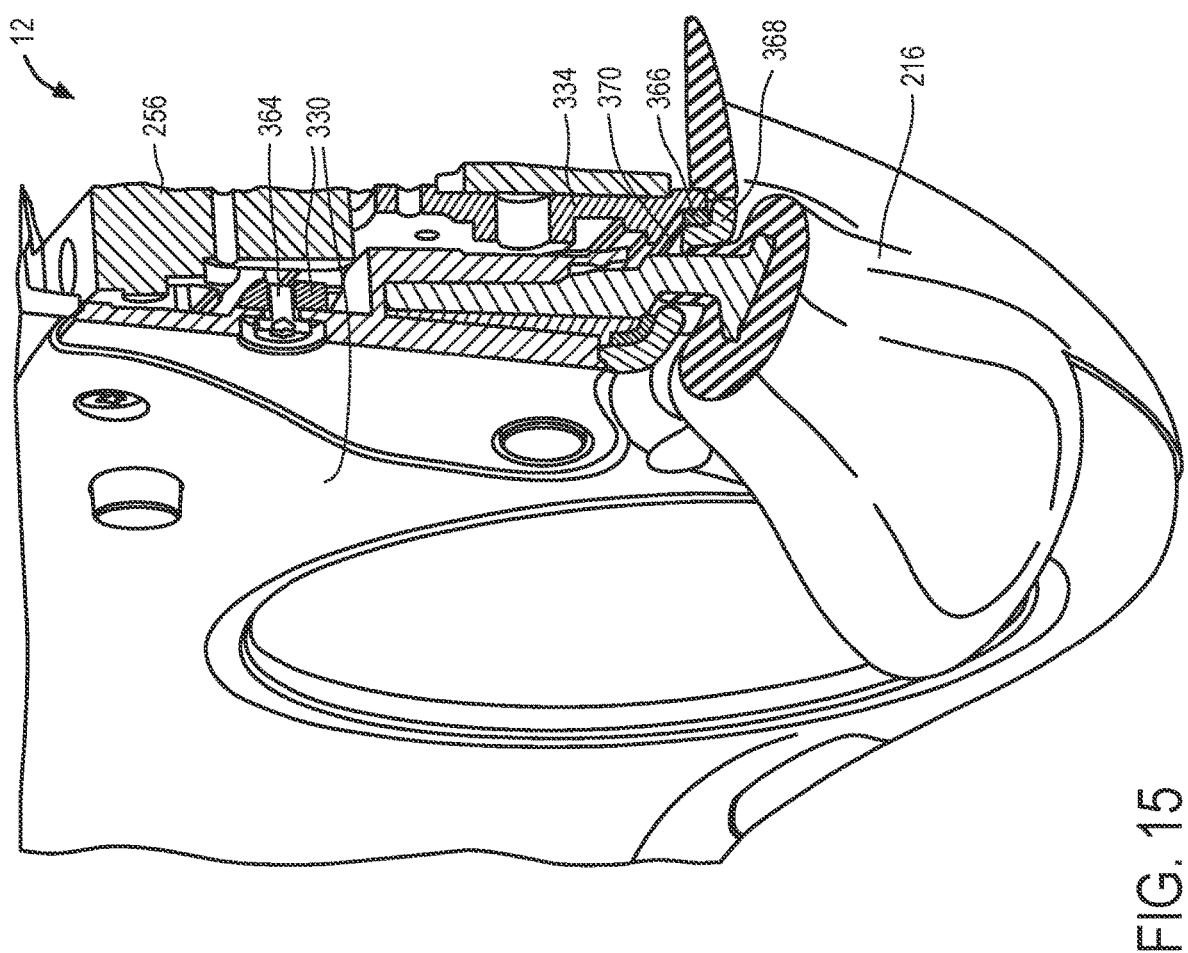
FIG. 15 is a perspective view in cross-section on B-B in FIG. 3.

FIG. 15 illustrates further components of the viewing device 12, including a fastener 364, a pliable member 366 and a barrier component 368. The fastener 364 is used to secure the anchor piece 256 to the front housing 330.

The pliable member 366 is secured in position between the barrier component 368 and the bionicle frame 334. When the nose piece 216 is installed, a rear surface of the stem 322 makes contact with the barrier component 368. The barrier component 368 is made of an electrically insulating material. The electrically insulating material of the barrier component 368 stops electric conductivity between a nose area of a user and the bionicle frame 334 as a means to protect against electric shock or the like. The barrier component 368 forms a seal between the nose piece 216 and the bionicle frame 334 to prevent ingress of dirt into an area 370 between the nose piece 216 and the bionicle frame 334.

When the user creates forces on the nose piece 216, such forces are transferred through the barrier component 368 to the pliable member 366. The pliable member 366 is a springable member that is made of an elastomeric material. The elastic properties of the pliable member 366 causes the pliable member 366 to compress and expand to absorb the forces and limit transfer of the forces to the bionicle frame 334.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A visual perception device comprising:
   a first nose piece that includes:
   a respective first locking component;
   a respective nose pad having a respective nose bridge portion and respective first and second nose tabs defining a respective inverted channel shape;
   a respective stem connecting the respective first locking component to the respective nose bridge portion; and a respective first locking formation on the respective first locking component;

first and second viewing components;

a viewing device frame that includes at least a viewing device frame bridge connecting the first and second viewing components to one another; and a second locking formation on the viewing device frame bridge, the second locking formation and the respective first locking formation being first and second inter-engaging locking formations respectively that are connectable to one another to removably mount the first nose piece to the viewing device frame bridge, wherein the respective first locking formation includes:

first and second lever arms respectively connected to the respective stem; and first and second clip formations respectively on the first and second lever arms, wherein the respective clip formations are depressed by the second locking formation to bend the respective first and second lever arms towards one another when the clip formation is inserted into the second locking formation and the respective first and second lever arms expanding when the respective first and second clip formations exit the second locking formation, wherein the respective first and second clip formations resist disengagement of the respective first locking formation from the second locking formation.

2. The device of claim 1, further comprising:

a second nose piece that includes:

a respective first locking component; and a respective nose pad having a respective nose bridge portion and respective first and second nose tabs defining a respective inverted channel shape; and a respective stem connecting the respective first locking component to the respective nose bridge portion; and a respective first locking formation on the respective first locking component, the second locking formation and the respective first locking formation being first and second inter-engaging locking formations respectively that are connectable to one another to removably mount the second nose piece to the viewing device frame bridge, wherein the stem of the second nose piece is longer than the stem of the first nose piece.

3. The device of claim 1, wherein the respective first locking component includes:

a respective force transfer member connected to the respective stem; and a respective elastic pad on the force transfer member, the respective elastic pad engaging against a stopper portion of the viewing device and compressing while the respective first locking formation is inserted into the second locking formation.

4. A method of visually perceiving light comprising:

removably mounting a nose pad to a viewing device frame bridge; and positioning the nose pad on a nose of a user, the nose pad having a nose bridge portion and first and second nose tabs defining an inverted channel shape, the nose bridge portion forming part of a viewing device frame that includes the viewing device frame bridge connecting first and second viewing components, wherein a first locking formation includes first and second lever arms respectively connected by a stem to the nose bridge portion, and first and second clip formations respectively on the first and second lever arms, wherein the first and second clip formations are depressed by a second locking formation on the viewing device frame bridge to bend the first and second lever arms towards one another when the first and second clip formations are inserted into the second locking formation and the respective first and second lever arms expanding when the first and second clip formations exit the second locking formation, wherein the first and second clip formations resist disengagement of the respective first locking formation from the second locking formation.

5. A visual perception device comprising:

a first nose piece that includes:

a respective locking component;

a respective nose pad having a respective nose bridge portion and respective first and second nose tabs defining a respective inverted channel shape;

a respective stem connecting the respective second locking component to the respective nose bridge portion; and a respective first locking formation on the respective locking component;

first and second viewing components;

a viewing device frame that includes at least a viewing device frame bridge connecting the first and second viewing components to one another; and a second locking formation on the viewing device frame bridge, the second locking formation and the respective first locking formation being first and second inter-engaging locking formations respectively that are connectable to one another to removably mount the first nose piece to the viewing device frame bridge, wherein the respective second locking component includes:

a respective force transfer member connected to the respective stem; and a respective elastic pad on the force transfer member, the respective elastic pad engaging against a stopper portion of the viewing device and compressing while the respective first locking formation is inserted into the second locking formation.

6. The device of claim 5, further comprising:

a second nose piece that includes:

a respective locking component; and a respective nose pad having a respective nose bridge portion and respective first and second nose tabs defining a respective inverted channel shape; and a respective stem connecting the respective second locking component to the respective nose bridge portion; and a respective first locking formation on the respective locking component, the second locking formation and the respective first locking formation being first and second inter-engaging locking formations respectively that are connectable to one another to removably mount the second nose piece to the viewing device frame bridge, wherein the stem of the second nose piece is longer than the stem of the first nose piece.

7. The device of claim 5, wherein the respective first locking formation includes:

first and second lever arms respectively connected to the respective stem; and first and second clip formations respectively on the first and second lever arms, wherein the respective clip formations are depressed by the second locking formation to bend the respective first and second lever arms towards one another when the first and second clip formations are inserted into the second locking formation and the respective first and second lever arms expanding when the respective first and second clip formations exit the second locking formation, wherein the respective first and second clip formations resist disengagement of the respective first locking formation from the second locking formation.

8. The device of claim 7, wherein each respective clip formation has an angular surface that engages with the locking formation to depress the first and second clip formations towards one another to allow for insertion of the respective first locking formations into the second locking formation.

9. The device of claim 8, wherein each respective clip formation has an inclined surface that engages with the locking formation to depress the first and second clip formations towards one another to allow for removal of the respective first locking formation from the second locking formation.

10. A method of visually perceiving light comprising:
removably mounting a nose pad to a viewing device frame bridge; and
positioning the nose pad on a nose of a user, the nose pad having a nose bridge portion and first and second nose tabs defining an inverted channel shape, the nose bridge portion forming part of a viewing device frame that includes the viewing device frame bridge connecting first and second viewing components, wherein a first locking formation includes a respective force transfer member connected to a stem and
a respective elastic pad on the force transfer member, the respective elastic pad engaging against a stopper portion of on the viewing device frame bridge and compressing while the respective first locking formation is inserted into second locking formation on the viewing device frame bridge.

* * * * *